United States Patent
Randall et al.

(10) Patent No.: US 11,665,663 B2
(45) Date of Patent: May 30, 2023

(54) TRANSMITTING DATA OVER A RADIO NETWORK

(71) Applicant: Entotem Limited, Derby (GB)

(72) Inventors: Andrew Paul George Randall, Berkshire (GB); David Ian Belcher, Wantage (GB); Alastair Bryers, Cholsey (GB); Andrew James Maxim, Andover (GB)

(73) Assignee: Entotem Limited, Derby (GB)

( * ) Notice: Subject to any disclaimer, the term of this patent is extended or adjusted under 35 U.S.C. 154(b) by 180 days.

(21) Appl. No.: 17/387,069

(22) Filed: Jul. 28, 2021

(65) Prior Publication Data

US 2022/0039049 A1 Feb. 3, 2022

(30) Foreign Application Priority Data

Jul. 29, 2020 (GB) .................................. 2011759
Jul. 30, 2020 (GB) .................................. 2011879
Jul. 31, 2020 (GB) .................................. 2011936

(51) Int. Cl.
 *H04W 64/00* (2009.01)
 *H04B 17/318* (2015.01)
 *H04W 52/18* (2009.01)

(52) U.S. Cl.
 CPC .......... *H04W 64/00* (2013.01); *H04B 17/318* (2015.01); *H04W 52/18* (2013.01)

(58) Field of Classification Search
 None
 See application file for complete search history.

(56) References Cited

U.S. PATENT DOCUMENTS

| 8,457,088 | B1 | 6/2013 | Bidichandi |
| 2004/0022214 | A1 | 2/2004 | Goren et al. |
| 2004/0248589 | A1 | 12/2004 | Gwon et al. |
| 2005/0255854 | A1* | 11/2005 | Sillasto ................ H04W 64/00 |
| | | | 455/456.1 |
| 2006/0281473 | A1 | 12/2006 | Debany et al. |

(Continued)

FOREIGN PATENT DOCUMENTS

| CN | 208433098 U | 1/2019 |
| GB | 594887 | 11/1947 |
| WO | 2015119655 A1 | 8/2015 |

OTHER PUBLICATIONS

Corresponding Great Britain Patent Application No. GB2011759.4, Search and Examination Report dated Jan. 19, 2021.

(Continued)

*Primary Examiner* — Suhail Khan
(74) *Attorney, Agent, or Firm* — Cooper Legal Group, LLC

(57) ABSTRACT

Data is transmitted over a radio network, in which a fixed transceiver transmits distance data to a network data processor and the fixed transceiver is required to wait after a transmission to maintain network compatibility. Bulk distance data is collected for a plurality of mobile transceivers during a ranging time slot. The bulk distance data is transmitted in a transfer time slot 3201, while maintaining network compatibility. Fixed time of flight is shown and transmission power is controlled to avoid automatic gain control at a receiver. Distance values may be averaged from each pair of distanced derived from each available pair of fixed transceivers when ranging a specific mobile transceiver.

18 Claims, 32 Drawing Sheets

(56) References Cited

U.S. PATENT DOCUMENTS

| | | |
|---|---|---|
| 2008/0291090 A1 | 11/2008 | Vandenameele |
| 2009/0275302 A1 | 11/2009 | Huston et al. |
| 2014/0133606 A1 | 5/2014 | Mochizuki |
| 2015/0181387 A1 | 6/2015 | Shaw |
| 2017/0265062 A1 | 9/2017 | Guerra et al. |
| 2018/0067187 A1 | 3/2018 | Oh et al. |

OTHER PUBLICATIONS

Corresponding Great Britain Patent Application No. GB2011897.0, Search and Examination Report dated Jan. 29, 2021.
Corresponding Great Britain Patent Application No. GB2011936.8, Search and Examination Report dated Jan. 14, 2021.

* cited by examiner

Fig. 14

| ANCHOR PAIR | FIRST POSITION | SECOND POSITION |
|---|---|---|
| A1,A2 | X1,Y1 | X2,Y2 |
| A1,A3 | X3,Y3 | X4,Y4 |
| A1,A4 | X5,Y5 | X6,Y6 |
| A1,A5 | X7,Y7 | X8,Y8 |
| A1,A6 | X9,Y9 | X10,Y10 |
| A2,A3 | X11,Y11 | X12,Y12 |
| A2,A4 | X13,Y13 | X14,Y14 |
| A2,A5 | X15,Y15 | X16,Y16 |
| A2,A6 | X17,Y17 | X18,Y18 |
| A3,A4 | X19,Y19 | X20,Y20 |
| A3,A5 | X21,Y21 | X22,Y22 |
| A3,A6 | X23,Y23 | X24,Y24 |
| A4,A5 | X25,Y25 | X26,Y26 |
| A4,A6 | X27,Y27 | X28,Y28 |
| A5,A6 | X29,Y29 | X30,Y30 |

*Fig. 20*

| ANCHOR PAIR | FIRST POSITION | SECOND POSITION |
|---|---|---|
| A1,A2 | x1,y1 | —— |
| A1,A3 | x3,y3 | —— |
| A1,A4 | —— | x6,y6 |
| A1,A5 | —— | x8,y8 |
| A1,A6 | —— | x10,y10 |
| A2,A3 | x11,y11 | —— |
| A2,A4 | —— | x14,y14 |
| A2,A5 | —— | x16,y16 |
| A2,A6 | x17,y17 | —— |
| A3,A4 | x19,y19 | —— |
| A3,A5 | —— | x22,y22 |
| A3,A6 | —— | x24,y24 |
| A4,A5 | x25,y25 | —— |
| A4,A6 | x27,y27 | —— |
| A5,A6 | —— | x30,y30 |

*Fig. 23*

| | |
|---|---|
| A2,A3 | x11,y11 |
| A2,A4 | x14,y14 |
| A2,A5 | x16,y16 |
| A2,A6 | x17,y17 |
| A3,A5 | x19,y19 |
| A3,A6 | x22,y22 |
| A4,A5 | x25,y25 |
| A4,A6 | x27,y27 |
| A5,A6 | x30,y30 |

*Fig. 25*

TRANSMITTING DATA OVER A RADIO NETWORK

CROSS REFERENCE TO RELATED APPLICATIONS

This application claims priority from United Kingdom Patent Application number 2011759.4, filed on Jul. 29, 2020, United Kingdom Patent Application number 2011879.0, filed on Jul. 30, 2020, and United Kingdom Patent Application number 2011936.8, filed on Jul. 31, 2020. The whole contents of United Kingdom Patent Application number 2011759.4, United Kingdom Patent Application number 2011879.0, and United Kingdom Patent Application number 2011936.8 are incorporated herein by reference.

BACKGROUND OF THE INVENTION

The present invention relates to a method of transmitting data over a radio network, in which a fixed transceiver transmits distance data to a network processor.

The present invention also relates to an apparatus for transmitting data over a radio network.

The use of transceivers to range the distance between devices is known. Given a plurality of ranges from a plurality of fixed transceivers, it should be possible to identify the location of a mobile transceiver. However, it is also known that ranging techniques introduce errors, therefore problems exist in terms of making best use of this data to actually specify a location. Problems also exist in terms of transmitting large volumes of data, while maintaining compatibility with radio transmission protocols.

BRIEF SUMMARY OF THE INVENTION

According to a first aspect of the present invention, there is provided a a method of assessing distances between a first transceiver and a second transceiver by measuring a round trip time of flight of a transmitted radio signal, comprising the step of: evaluating the intensity of a received radio signal; increasing transmitter power if said intensity is below a first threshold; and decreasing said transmitter power if said intensity is above a second threshold, to reduce the introduction of ranging errors due to automatic step changes being made to input amplification.

In an embodiment, the method further comprises the steps of: assessing distance by performing a plurality of ranging transmissions during a ranging interval; and using mutually different transmission characteristics, said characteristics non-exclusively selected from a list including frequency and phase polarization. The evaluating step may further comprise the steps of: obtaining a signal strength indication for each ranging transmission during a distancing assessment; and averaging said obtained signal strength indications to produce said intensity for said assessed distance. In an embodiment, the method further comprises the steps of: transmitting a power adjustment instruction from said first transceiver to said second transceiver; and adjusting transmitter power at said second transceiver in response to receiving said power adjustment instruction.

The invention also provides for the implementation of these methods on appropriate apparatus.

According to a second aspect of the present invention, there is provided a method of specifying the location of a mobile transceiver that communicates with a plurality of fixed transceivers, comprising the step of: assessing the distance of said mobile transceiver from each said fixed transceiver in response to the transmission of radio signals; selecting each pair combination of assessed distances to identify two candidate positions for each pair selection; and identifying a location by calculating the average of said candidate positions.

In an embodiment, the method further comprises the steps of: determining the displacement of each candidate position from the identified location; for each of said two positions derived from each pair combination of fixed transceivers, discarding the one most distant from the identified location; and recalculating a revised location from the remaining candidate positions. The method may also comprise the steps of: analysing the extent to which the remaining candidate positions are displaced from said revised location; removing the most displaced candidate position to identify fewer candidate positions; and recalculating a further revised location from said fewer candidate positions.

The invention also provides for the implementation of these methods on appropriate apparatus.

According to a third aspect of the present invention, there is provided a method of transmitting data over a radio network, in which a fixed transceiver transmits distance data to a network data processor and said fixed transceiver is required to wait after a transmission to maintain network compatibility, comprising the steps of: collecting bulk distance data for a plurality of mobile transceivers during a ranging time slot; and transmitting said bulk distance data in a transfer time slot, while maintaining network compatibility.

In an embodiment, each fixed transceiver initiates the transmission of bulk distance data in a subsequent transfer time slot, after the completion of the previous transfer time slot.

The invention also provides for the implementation of these methods on appropriate apparatus.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

BRIEF DESCRIPTION OF THE SEVERAL VIEWS OF THE DRAWINGS

FIG. 14 illustrates data tables updating on a cycle-by-cycle basis;

FIG. 20 identifies candidate positions;

FIG. 23 illustrates the retention of candidate locations;

FIG. 25 illustrates candidate positions after a further degree of refinement;

DETAILED DESCRIPTION OF EMBODIMENTS OF THE INVENTION

FIG. 1

Figure 1:
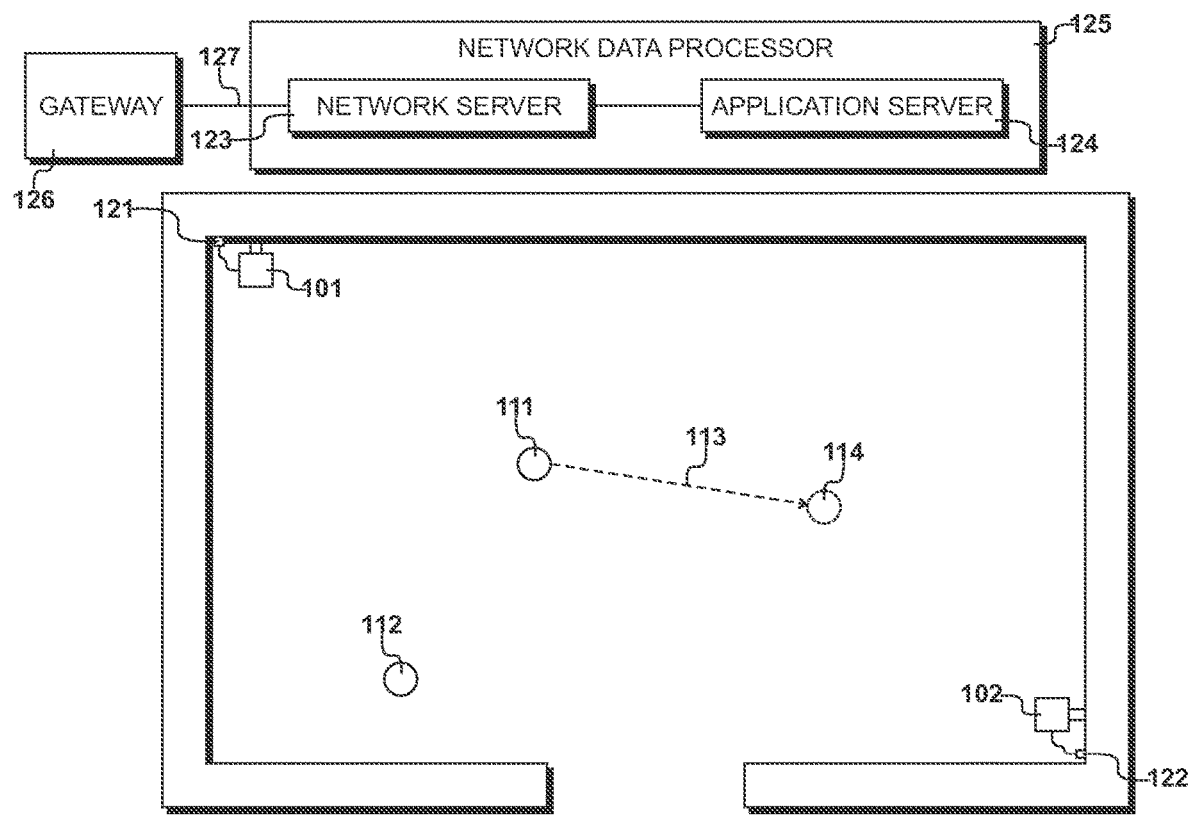
FIG. 1 illustrates tags moving within an environment.

As illustrated in FIG. 1, in this embodiment, distances are measured by a round-trip time-of-flight of a transmitted radio signal. In an embodiment, many signals of this type are transmitted such that, based on many range values, it is possible to put forward a best assessment as to what is considered to be the actual distance of a second transceiver from a first transceiver.

The environment of FIG. 1 may be considered as a room within a building, within which a first fixed transceiver 101 and a second fixed transceiver 102 have been deployed. These fixed transceivers may also be referred to as "anchors", from which the distance to one or more mobile transceivers may be assessed.

In the embodiment of FIG. 1, a first mobile transceiver 111 is provided, along with a second mobile transceiver 112. The mobile transceivers may also be identified as "tags" such that, as illustrated in FIG. 1, a first tag 111 may move in the direction of dashed arrow 113 to a new location 114; while, in this example, the second tag 112 remains stationary.

In the example shown in FIG. 1, only two anchors are provided and only two tags are provided, for illustrative purposes. To locate the actual position of tags within the environment, an embodiment includes more anchors, such that positions of tags may be identified with reference to their distance from a significant number of fixed anchors. Furthermore, many environments will include substantially more tags, such that a scheduling operation is required, allowing a sufficient number of ranging operations to be performed over sufficiently small intervals, thereby allowing the tags within the environment to be located and tracked substantially in real time.

Thus, multiple distancing operations are scheduled, to allow the position of many tags to be identified. To locate the position of a particular tag, many ranging operations are required to assess the distance of a particular tag from a particular anchor. Furthermore, given the inherent difficulties of deploying return time-of-flight techniques, an embodiment performs many ranging calculations, each derived from a specific radio transmission and retransmission, from which distance values are assessed.

To summarize, an embodiment is required to make accurate distance measurements, possibly performing many ranging transmissions, to identify the actual distance of a specific tag with respect to a specific anchor. Having determined distances of this type, for a specific tag with respect to several anchors, a computational technique is required to determine the actual location of the tags within the environment.

In some environments, all transceivers may occupy a common plane, thereby creating a two-dimensional problem. However, many real-life applications position tags at different heights and buildings may include many floors. Thus, in such an environment, a three-dimensional solution is required. Furthermore, with many tags present within the environment, many distance assessments are required, therefore the scheduling of these operations should aim to optimize use of the available frequencies and timeslots.

Distance assessment is performed by instructing an anchor, such as the first anchor 101, to initiate an exchange with a tag by transmitting a set-up packet. This packet identifies a start channel, the number of ranging exchanges to take place and which of two antennas to use. The antennas are mutually orthogonal, to ensure that communication is not lost due to a polarization mismatch and, in an embodiment, both antennas are selected. This approach facilitates the mitigation of multi-path issues. If two distant measurements are obtained and one is longer than the other, the shorter of these two is selected, on the basis that this range will have incurred fewer reflections and therefore provides a more accurate assessment of the actual distance.

In this description, a single specific radio transmission and retransmission allows a single range to be calculated based on the return time-of-flight. In an embodiment, many ranging operations of this type are performed within a ranging interval using mutually different transmission characteristics. After considering all of these range values identified during a ranging interval, an individual distance is assessed, thereby producing a single distance output per iteration.

The first fixed anchor 101 receives power from an external power supply 121, with a similar second external power supply 122 supplying power to the second fixed anchor 102. In an embodiment, power is derived from a power-over-ethernet system, on the basis that such a supply is likely to include an uninterruptable power supply and will therefore not experience a non-operational state should the general power supply fail.

An ethernet connection may also be used to establish communications with a network processor. However, in an embodiment, system data communications will occur within the radio network itself. Furthermore, the radio network established for ranging purposes may also provide a platform for other data-transmission applications. The radio network may follow established LoRa protocols, to provide a long-range, low-power, wide-area network, based on spread spectrum modulation.

The environment of FIG. 1, in this embodiment, may be deployed to locate people and assets in three dimensions, using latitude, longitude and altitude. In this example, the LoRa network, having been originally designed for the internet of things, has a built-in security protocol. However, other radio systems could be deployed.

In an embodiment, Semtec SX1280 devices are used that are capable of running a LoRa network at 2.4 gigahertz with a standard wireless ISM (industrial, scientific and medical) band circuit. Procedures provided with these devices allow time-of-flight measurements to be made between two radio receivers but, as described herein, further procedures are required to mitigate the effects of multi-path transmission.

Control instructions can be retained in cloud-based systems or may be supported by local hardware. The embodiment of FIG. 1 includes a network server 123 and an application server 124 which, collectively, may be identified as a network data processor 125. The use of equipment of this type is well established for use in LoRa network environments.

A gateway 126 provides translation between an internet protocol network 127 and the LoRa radio network. Devices within the LoRa network transmit packets, supporting different classes of devices within the network. When a device first appears, it joins as a class A device. It has its radio off for most of the time, unless transmitting a packet to the gateway. It has a transmit window and must then wait a predetermined time to allow for two receive windows. The network server can only transmit to a class A device after the class A device has first transmitted to the network server. The network server can then only transmit to the device during the receive windows. Thus, the gateway of the application server can only transmit to the class A device during the receive windows. In accordance with this protocol, the gateway produces a beacon that is transmitted every 128 seconds and is synchronised to GPS time.

In addition to class A device behaviour, class B devices align their reception windows to ping slots that are determined by the gateway. A class B device is informed of the ping slots and at the correct time, puts on its receiver and listens for packets from the gateway. In this embodiment, all of the devices within the environment, that is to say, the tags and the anchors, are class B devices.

Thus, the LoRa protocol provides synchronisation, with each beacon being synchronised to GPS time. The anchors are required to communicate with the tags at specific scheduled points in time. To reduce power consumption, the radios on the tags are inactive for as long as possible.

FIG. 2

Figure 2:
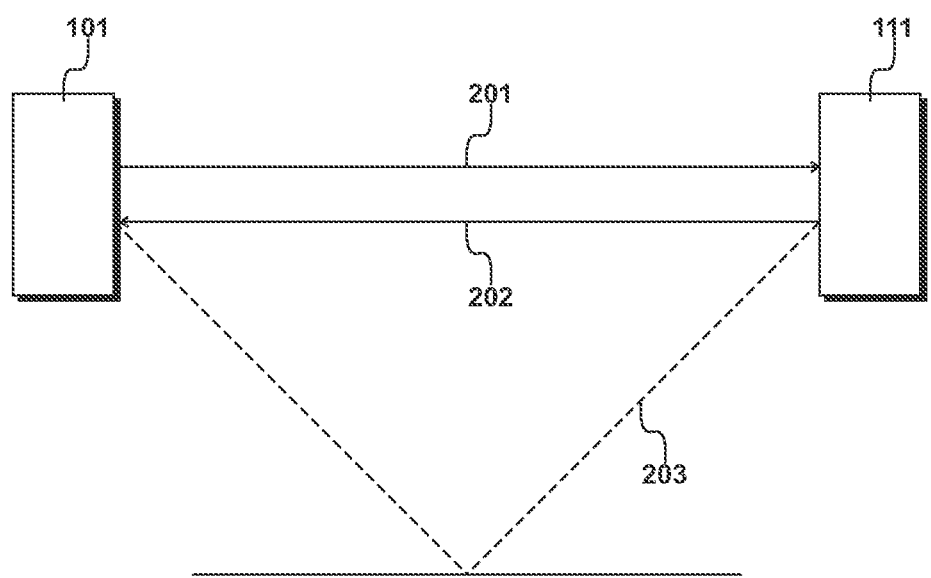
FIG. 2 illustrates a fixed anchor performing a ranging operation with respect to a mobile tag.

Fixed anchor 101 is illustrated in FIG. 2, performing a ranging operation with respect to the first mobile tag 111. In an embodiment, the fixed transceivers and the mobile transceivers are implemented as Semtech SX1280 devices, produced by Semtech Corporation of Camarillo, Calif. USA.

Distance measurements are made between the first anchor 101 and the first mobile tag 111 by measuring the time taken for a radio signal 201 to be transmitted from the anchor 101 to the tag 111 and then the time taken for a second radio signal to be returned back, by being transmitted by the second tag 111 and received by the first anchor 101. Measured durations are then converted to ranges with reference to the speed of propagation. Time-of-flight calculations of this type provide accurate measurements when transmissions occur in the direction of line-of-sight, as indicated by a first propagation path 201 and a second propagation path 202. However, problems with this approach can occur due to the presence of reflections. Thus, as an alternative to adopting the second transmission path 202, for example, the return communication could adopt a third transmission path 203, resulting in a longer transmission time and a resulting erroneous evaluation of range.

To mitigate these issues, each distance assessment does not rely upon a single evaluation of range. In particular, in an embodiment, many ranging transmissions are made using different transmission frequencies; or more specifically, different "chirps" within the chirp spread spectrum technology of LoRa WAN. Furthermore, mutually orthogonally displaced antennas are deployed from which, as previously described, the group of ranges providing the shorter distance is selected in preference to the longer distance.

Within the established radio protocol, each anchor, with a permanent power supply, may be established as a ranging master which then performs ranging operations with a mobile tag, identified as the ranged slave. To determine the range of the slave from the master, the ranging master 101 sends a ranging request to the ranged slave 111, which in turn returns a synchronized response back to the master. The master measures and interpolates the time elapsed between the ranging request and the response, such that the measured time reported by the master is the round-trip time between the master and the slave; with the actual propagation of radio waves occurring at the speed of light. The resulting measured time is therefore indicative of the measured round-trip distance with additional timing errors. Protocols within the devices themselves attempt to compensate for these errors, resulting in the generation of output data representing an assessment of the distance between the slave transceiver 111 from the master transceiver 101.

Within the devices, static sources of measurement error are corrected by calibration. However, further errors may be introduced due to reference oscillator drift and analog group delay. The master's timing measurement and the slave's synchronization are performed using local crystal reference oscillators, therefore any offset in timing between the master crystal oscillator and the slave crystal oscillator will result in an erroneous distance measurement. However, the same reference oscillator is used to derive both the timing for ranging operations and the radio frequency carrier at 2.4 gigahertz. Consequently, it is possible to measure the frequency error between the transmitter and the receiver to reliably indicate timing offsets.

The SX1280 device, deployed in an embodiment, and other similar devices, are configured to use automatic gain control to adapt the gain of receivers to the received signal strength. This known approach facilitates the reception of both low power signals, at the limits of sensitivity, and high-power signals at short range. However, this approach also impacts upon the operation of the return time-of flight measurements, in that the delay through low noise variable gain amplifiers changes as a function of amplifier gain.

Figure 3:
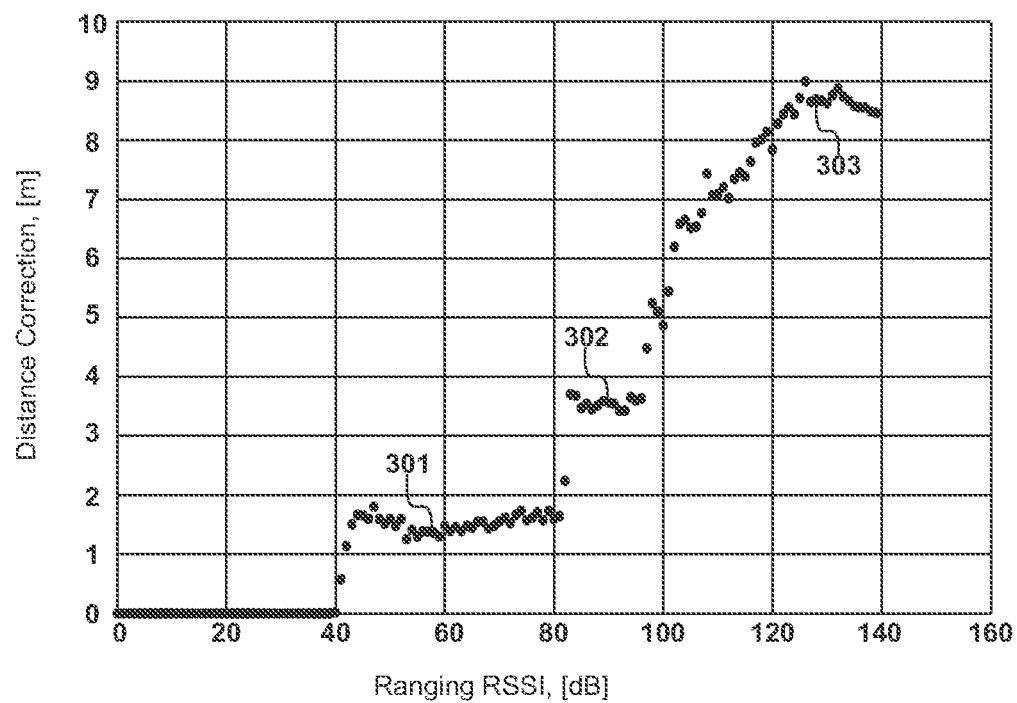
FIG. 3 illustrates discontinuities in distance correction values.

To facilitate adjustments of this type, the signal strength of the received signal (received signal strength indication, RSSI) is measured. It is assumed that the channel remains static for the duration of a single ranging exercise and that the signal power seen by the master gives an indication of the receiver gain used by both master and slave. In this implementation, the ranging RSSI differs slightly from conventional measurements of this type in that, instead of indicating a value in absolute power, the ranging RSSI indicates the received signal power relative to a signal power threshold. From empirical measurements, it is possible to construct a lookup table of ranging RSSI values with reference to range measurement correction. A plot of correction values of this type is illustrated in FIG. 3.

FIG. 3

Experiments have shown that distance correction values do not vary in a continuous way but exhibit discontinuities, resulting in the establishment of a first plateau 301, a second plateau 302 and a third plateau 303.

These discontinuities exist due to amplifier gain stages being selected and the present inventors have found that significant errors may occur when gain changes of this type take place during a ranging operation.

FIG. 4

Figure 4:
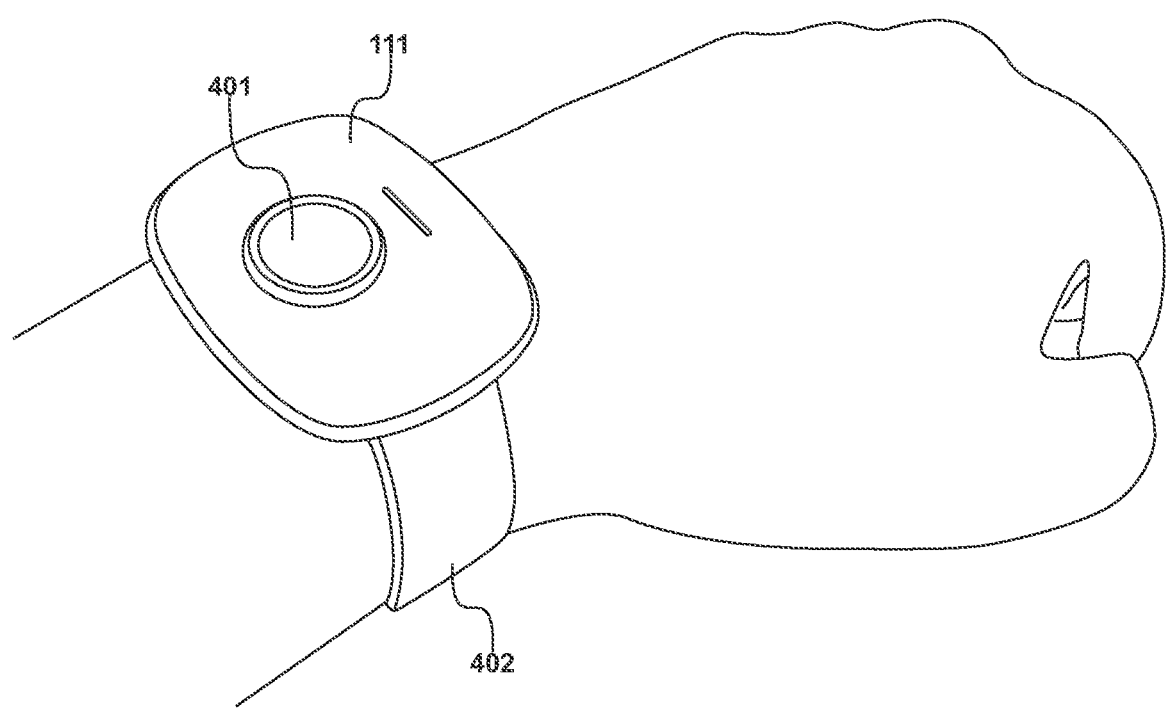
FIG. 4 shows an example of a mobile tag.

Mobile tag 111 is illustrated in FIG. 4. This represents the second transceiver and is mobile within the environment. As such, the second transceiver receives energy from a local battery 401.

The fixed transceivers, such as anchor 101, are each configured as a master and the mobile transceivers, such as tag 111, are each configured as a slave. Furthermore, the slave transceivers are configured to minimise radio transmissions to thereby conserve energy and maximize the operational life of the battery 401.

In the embodiment of FIG. 4, an attachment device 402 is provided for attaching the second mobile transceiver to a person.

FIG. 5

Figure 5:
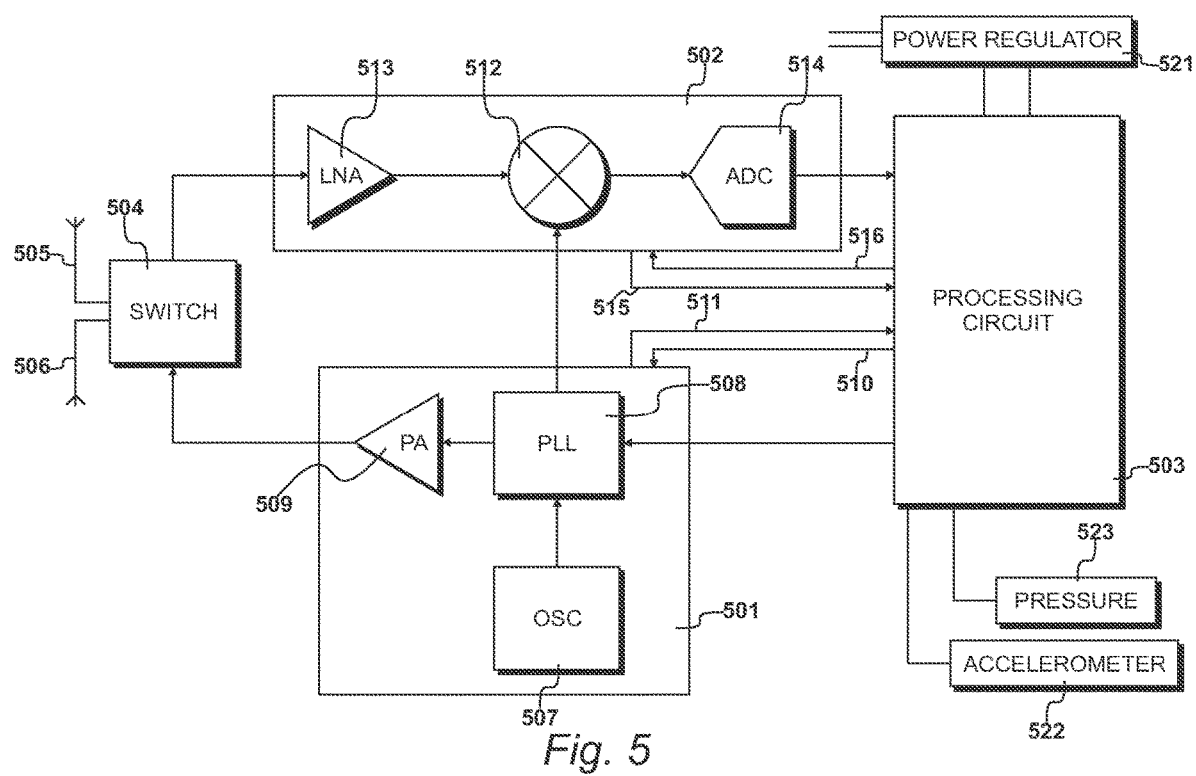
FIG. 5 shows a schematic representation of a transceiver.

A schematic representation of an example of a transceiver is shown in FIG. 5. The equipment is substantially similar for an anchor 101 and for a tag 111. The transceiver shown in FIG. 5 may therefore be considered as a first transceiver for anchor 101, working with a substantially similar second transceiver such that, in combination, they provide an apparatus for assessing a distance by measuring a round-trip time-of-flight of transmitted radio signals.

The first transceiver has a first transmitter 501 along with a first receiver 502. In addition, a processing circuit 503, including circuitry for modulation and demodulation, includes an evaluator for evaluating the strength of a signal received by the first receiver 502.

The apparatus also includes a second transceiver having a second transmitter (substantially similar to the first transmitter 501) along with a second receiver (substantially similar to the first receiver 502).

The anchor transceivers include a switch 504 for selecting a first antenna 505 or a second antenna 506. These antennas are mutually offset, such that their transmission characteristics define different phase polarizations. In an embodiment, both antennas are used, resulting in ranging transmissions using the first antenna 505 considered to be in a first group, along with ranging transmissions taking place using the second antenna 506 considered to be placed in a second group. Furthermore, the switch 504 also controls connection of the selected antenna to the transmitter 501 or to the receiver 502. A similar switch is provided at the tag transceivers but they are only provided with one antenna.

Thus, when a ranging exchange takes place, the transmitter at the first transceiver is selected while the receiver at the second transceiver is selected. The signal is then returned by reversing these functionalities, such that the transmitter is connected to the selected antenna at the second transceiver and the receiver is connected to the selected antenna at the first transceiver.

In this embodiment, the transmitter 501 includes a crystal oscillator 507 supplying a phase-locked loop 508 which in turn receives control signals from the processing circuit 503. A modulated output from the phase-locked loop 508 is supplied to an output power amplifier 509 prior to being supplied to the switch 504.

The processing circuit 503 supplies transmitter control signals on a transmitter control line 510. Transmitter status is returned to the processing circuit 503 from the transmitter via a transmitter status line 511. Having performed a ranging exchange, the first transceiver will have performed an evaluation of the signal strength of the signal received by the first receiver 502. In response to this evaluation, it is possible for the processing circuit 503, using the transmitter control line 510, to increase the transmission power of the first transmitter 501 by increasing the transmission power of the output power amplifier 509. Thus, if the signal strength is evaluated to be below a first threshold, the transmission power is increased. If the signal strength is evaluated to be above a second threshold, the transmission power is decreased.

In the receiver 502, a mixer 512 receives an output from the phase-locked loop 508. When receiving, the switch 504 supplies an input signal to a low noise amplifier 513 and the output from this low noise amplifier is supplied to a mixer 512 before being conveyed to an analog-to-digital converter 514 for application to the processing circuit 503. The processing circuit 503 receives details of receiver status on a receiver status line 515. Furthermore, the processing circuit 503 supplies receiver control signals to the receiver on a receiver control line 516.

In response to receiving status information from the receiver, the processing circuit 503 may determine that the received signal is too low and may therefore instruct the low noise amplifier 513 to increase receiver gain. Thus, the first transceiver has a first input amplifier configured to amplify input signals received by the first receiver. In this embodiment, the first threshold and the second threshold are selected to reduce the introduction of errors due to automatic changes being made to the level of amplification provided by the first amplifier.

Thus, the embodiment seeks to maintain communication between the first transceiver and the second transceiver at an appropriate transmission power, thus ensuring that data is received at the receiver and the transmitted signal is not too high or too low. However, to avoid the introduction of errors, the embodiment seeks to make changes to the power amplifier 509 in preference to allowing changes to be made to the low noise amplifier 513. In particular, the first transceiver is configured to reduce the introduction of errors by preventing the first input amplifier from switching between amplification stages.

In an embodiment, the first transceiver and the second transceiver are configured to assess a distance during a ranging interval. Many ranging transmissions occur during the ranging interval, with these transmissions having mutually different characteristics. An assessment of distance is then made in response to processing many ranging evaluations.

In an embodiment, the evaluator is configured to evaluate a signal strength value for a ranging interval by considering many signal strength values identified form individual ranging transmissions. In an embodiment, the signal strength value is evaluated by averaging the ranging signal strength values. In an embodiment, the different transmission characteristics include different transmission frequencies. More specifically, the LoRa protocol may be adopted using a chirp spread spectrum modulation by representing each bit of payload information by multiple chirps of information. This in turn results in the presentation of many channels, such that all channels may be used to perform a ranging exercise and similar ranging operations may be performed in parallel, given that different channels are deployed at different times, hence presenting a multiplex.

In an embodiment, forty channels may be available in a form compatible with the Bluetooth® low energy channel plan. A frequency hopping approach is adopted, such that a single ranging exchange is performed on a single frequency which is then followed by a hop to the next frequency for a similar exchange to take place. In an embodiment, this sequence is performed for the first antenna and then repeated for the second antenna. This represents a complete ranging interval, allowing a distance to be assessed from a total of eighty ranging measurements. Furthermore, many exchanges of this type may be multiplexed by performing a similar frequency hopping sequence but relatively out of phase. Sophisticated scheduling is therefore required to make optimum use of the available transmission environment.

Devices receive power via a power regulator 521 which, for the anchors, receives power from a permanent source or for the tags, power is received from a local battery.

To detect movement of the moving tags, an accelerometer 522 produces data indicating movement. This allows an assessment to be made to the effect that a moveable tag has not actually moved and as such, measured distances represent the same actual distance and may be averaged to provide more accurate results.

The embodiment is also provided with a pressure sensor 523. The pressure sensor 523 is sufficiently sensitive to provide indications of changes in altitude. Thus, for a moveable tag, a pressure change may indicate that a person or an asset has moved or has been moved between floors. In this way, it is possible for the processing circuit 503 to be configured to compensate assessed distances with respect to vertical displacements, such that subsequent processing of the position data may be performed upon two-dimensional position data.

Thus, for example, having recognised that movement has occurred between floors, it is now only necessary to identify a location within the two-dimensional floor plan. Furthermore, it is likely that anchors will be supported just below ceiling height and as such will tend to be higher than the tags. The distance between an anchor and a tag is therefore a three-dimensional distance. However, with the difference in altitude being known, it is possible for ranging calculations to be compensated, to identify positions on the two-dimensional ground plan.

Having determined that tags and anchors are on the same floor, it is likely that differences in altitude are relatively negligible when compared to other sources of error. For example, with a tag located three feet above the floor and with an anchor positioned at eight feet above the floor, the actual distance in three dimensions may be, for example, eight inches greater than the distance covered in two dimensions. However, given that ranging errors are likely to introduce a variation of plus or minus three feet, errors introduced due to the three-dimension to two-dimension simplification are not significant.

FIG. 6

Figure 6:
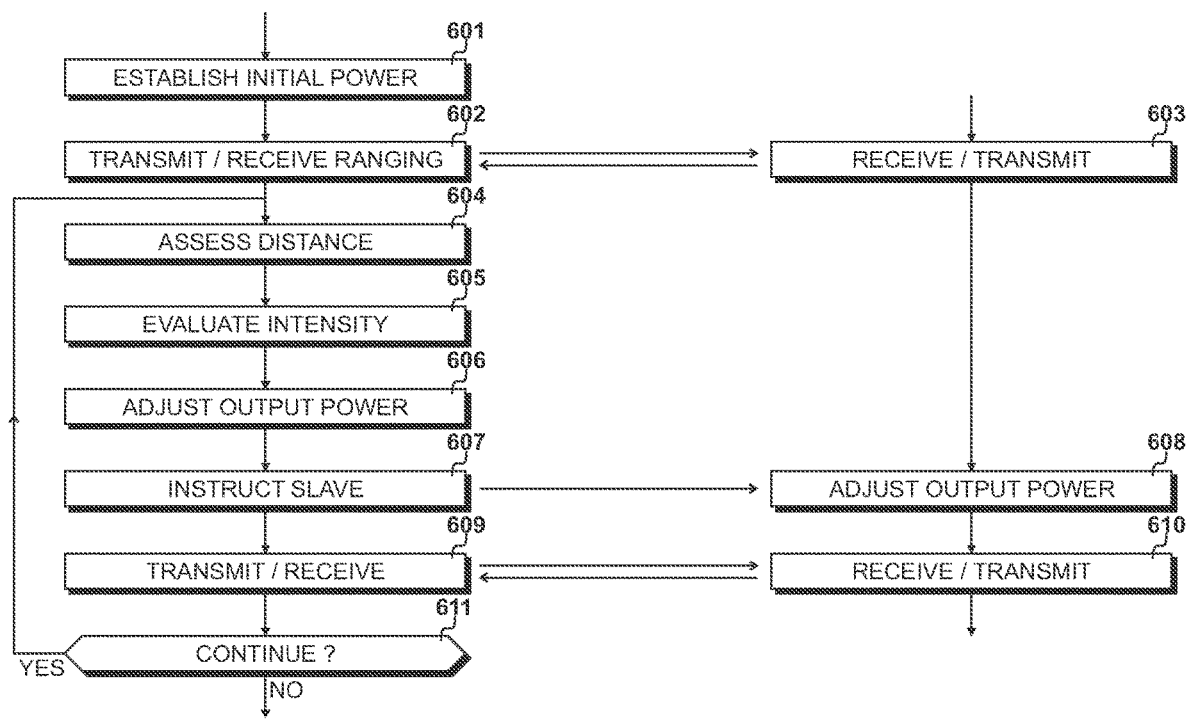
FIG. 6 shows procedures for implementing a method of assessing a distance between a first transceiver and a second transceiver.

Procedures for implementing a method of assessing a distance between a first transceiver and a second transceiver by measuring a round trip time-of-flight of a transmitted radio signal are shown in FIG. 6. At step 601 an initial output power is established at the first transceiver which then initiates a ranging interval at this initial power level. At step 602, a ranging transmission occurs on a selected channel, with transmission taking place from the first transceiver for reception by the second transceiver. At the second transceiver, at step 603, the signal is re-transmitted on the selected channel back to the first transceiver.

These interactions are repeated within the ranging interval, thereby producing a first group of ranging values relating to ranges calculated using the first antenna pair, along with a second group of ranging values calculated while using the second antenna pair. Thus, in an example, a ranging interval involves a total of eighty radio exchanges that may be divided into two groups, with each group making use of all forty available channels.

At the first transceiver, at step 604, a distance is assessed to produce an actual distance value. This may also be identified as a "range" but for the purpose of this disclosure, the word "range" will be used with reference to a range calculated from an individual radio action, and the term "distance" will be identified when an actual assessment has been made of all of these interactions to produce what may be considered the best evaluation of distance for a particular iteration.

At step 605, the first transceiver makes an evaluation of signal intensity whereafter, at step 606, it is possible for an adjustment of output power to be made. Thus, the intensity of a received radio signal is evaluated, whereafter transmitter power is increased if the intensity is below the first threshold, with the transmitter power being decreased if this intensity is above a second threshold. In an embodiment, this operation is performed to reduce the introduction of ranging errors due to automatic changes being made to input amplification, as described with reference to FIG. 5.

If an adjustment to output power has been made at step 606, a transmission is instigated at step 607 instructing the second transceiver, acting as a slave, to make a similar adjustment to its local output transmission power. Thus, at step 608, the second transceiver adjusts output power in anticipation of the next ranging transmissions.

Thus, on the next cycle, ranging transmissions are initiated by the first transceiver at step 609, with similar signals being returned by the second transceiver at step 610.

In this example, a question is asked at step 611 as to whether the process is to continue and when answered in the affirmative, control is returned to step 604 for a further assessment of distance to be implemented. Alternatively, the procedures may be terminated by the question asked at step 610 being answered in the negative. In an embodiment, it would be possible for specific radio transmissions to take place exclusively for the evaluation of signal strengths. However, in an embodiment, radio transmissions made to perform the actual distance measuring operations are themselves considered, with reference to their own signal strength measurements, to facilitate this dynamic adjustment.

In an alternative embodiment, each slave is configured to return its own ranging RSSI or some equivalent information in the ranging response. This information provides an indication of the analogue delay introduced by the slave's electronics when returning the ranging response symbols.

In an embodiment deploying SX1280 devices, an internal calibration delay register is present, that allows for design specific delays, such as those due to PCB trace and antenna delays, to be automatically compensated in the ranging procedures. In this deployment, the ranging master's analog delay taken from the master calibration value register is added to the ranging slave analogue delay value (the slave calibration value) which is returned by the slave in the ranging response message. The total calibration delay is then subtracted from the actual measured ranging delay. This arrangement allows interoperability between different physical hardware designs of master and slave devices.

In a specific deployment, the processor could choose to either return the ranging RSSI or equivalent information as a separate value in the ranging response or it could use the ranging RSSI information to dynamically modify the calibration value that is already returned by the slave device. These approaches require an assumption to be made to the effect that the low noise amplifier 513 gains and hence delays, are the same at both the master and the slave devices.

In this particular implementation, signal strength information is available from a register identified as RSSI and the embodiment aims to maintain this value at around seventy-five dB, representing substantially the middle of the largest flat region 301, such that it is more likely to result in similar low noise amplifier gains at both ends.

Within the protocol, transmission power is specified, such that anchors and tags operate at similar transmission powers when performing a ranging operation. The present embodiment makes use of dynamically controlled transmission power to inhibit adjustments to variable-gain input amplifier stages.

FIG. 7

Figure 7:
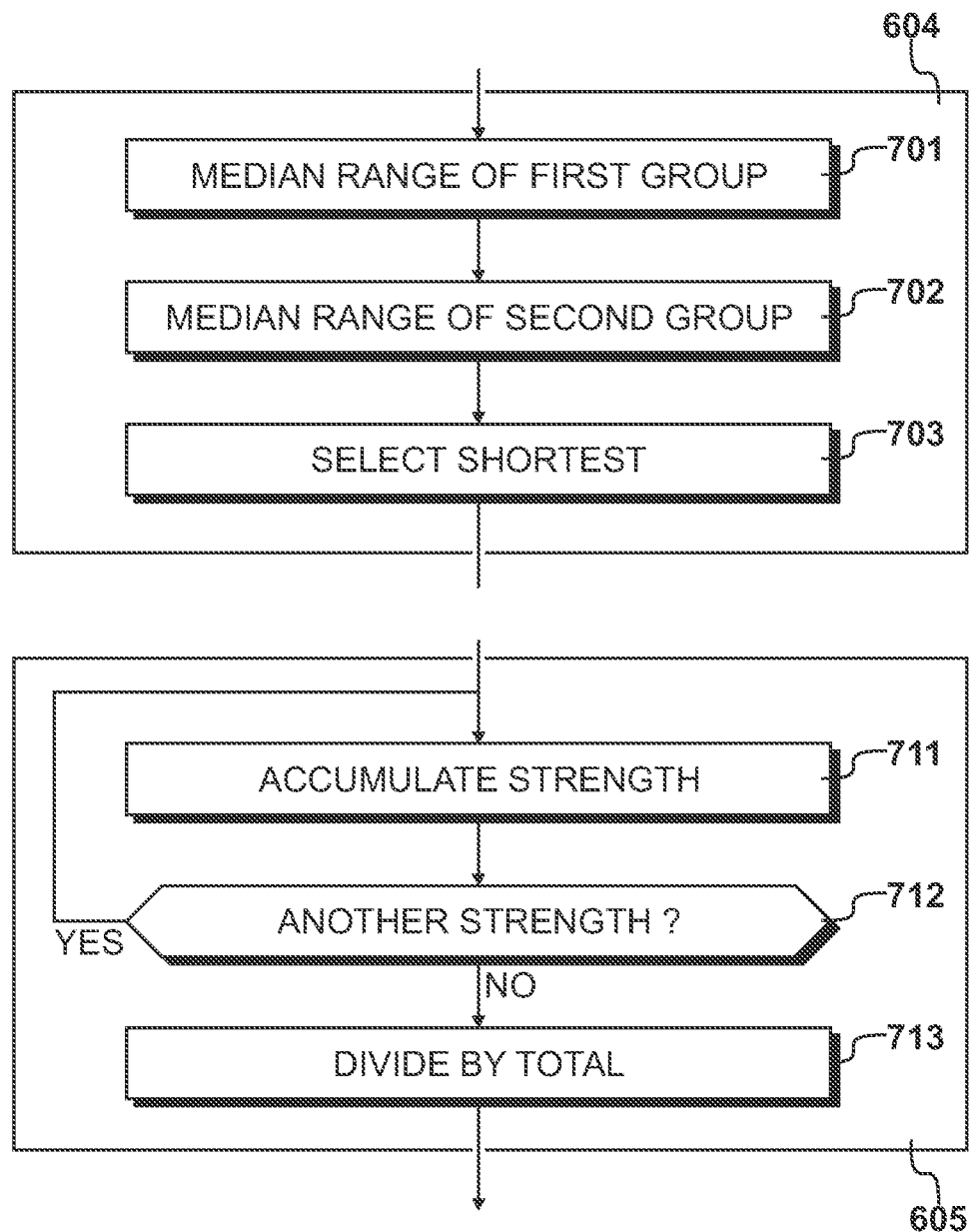
FIG. 7 illustrates procedures for assessing distance and procedures for evaluating intensity identified in FIG. 6.

Procedures 604, for assessing distance, are illustrated in FIG. 7. At step 701, the first group of transmissions is selected, relating to the first aerial pair, from which a median average is calculated. Use of the median (as distinct from the mean) is preferred, as ranging values at the extremes will clearly be erroneous. Thus, at step 702, a similar median range value is calculated for the second group.

At step 703, the median value calculated at step 701 is compared with the median values selected at step 702 and from these the shortest median value is selected as the output distance value. The shortest is selected because a longer range will tend to be less accurate than a shorter range, given that the extended distance will be caused by reflections, described with reference to FIG. 2. Thus, it is this distance which is selected as the assessed distance which is then conveyed to the application server, where assessed distances from many anchors are processed to specify tag positions.

Procedure 605 for evaluating intensity are also shown in FIG. 7. For each of the eighty ranging interactions, a signal strength measurement will be made. On this occasion, it is preferred to calculate a mean value of the signal strengths derived from all interactions. Thus, a signal strength is accumulated at step 711 whereafter, at step 712, a question is asked as to whether a further signal strength value is available. When answered in the affirmative, the next value is accumulated at step 711 and the process is repeated until all values have been accumulated. This is then divided by the total number of interactions that have taken place at step 713 to provide a mean value of signal strength.

FIG. 8

Figure 8:
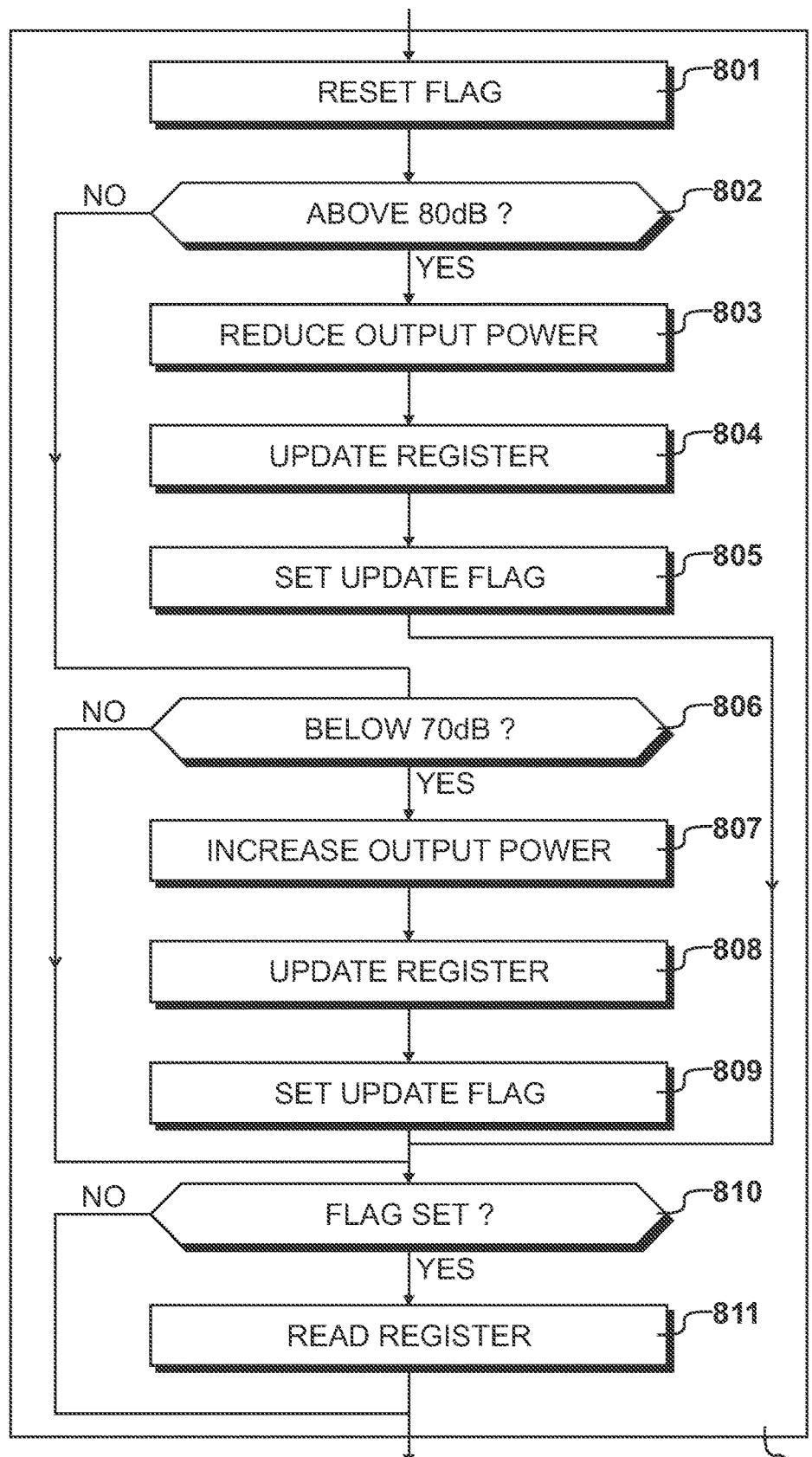
FIG. 8 details procedures for adjusting output power identified in FIG. 6.

Procedures 606, for adjusting transmitter power, are shown in FIG. 8. At step 801 an internal flag is reset and in this reset condition, no adjustment will be made to transmitter power. However, if, subsequently, the flag is set, an adjustment will be made on this iteration.

Having received the second signal 704, a question is asked at step 802 as to whether the strength of the signal is above eighty dB. In this embodiment, a signal strength of seventy-five dB is considered optimal, with eighty dB representing an upper bound and seventy dB representing a lower bound. Thus, if the signal strength is above eighty dB, the question asked at step 802 is answered in the affirmative and output power is reduced at step 803. Thus, at step 803, a local adjustment to output power is made. However, it is now necessary to convey this information back to the remote tag to enable power adjustment step 608. To achieve this, a register is updated at step 804 and the flag is set at step 805.

If the question asked at step 802 is answered in the negative, to the effect that the received signal strength is not above eighty dB, a question is asked at step 806 as to whether the received signal strength is below seventy dB. If answered in the affirmative, output power is increased at step 807, which, again, results in a local adjustment. A register is updated at step 808 and the flag is set at step 809. Control then continues to step 810. However, if the question asked at step 806 is answered in the negative, control is directed to step 810.

At step 810, a question is asked as to whether the flag has been set. If answered in the negative, no further action is required. However, if the question asked at step 810 is answered in the affirmative, the register, updated at step 804 or at step 808, is read, to facilitate the transmission of a power adjustment command at step 607, which is then implemented at step 608.

FIG. 9

Figure 9:
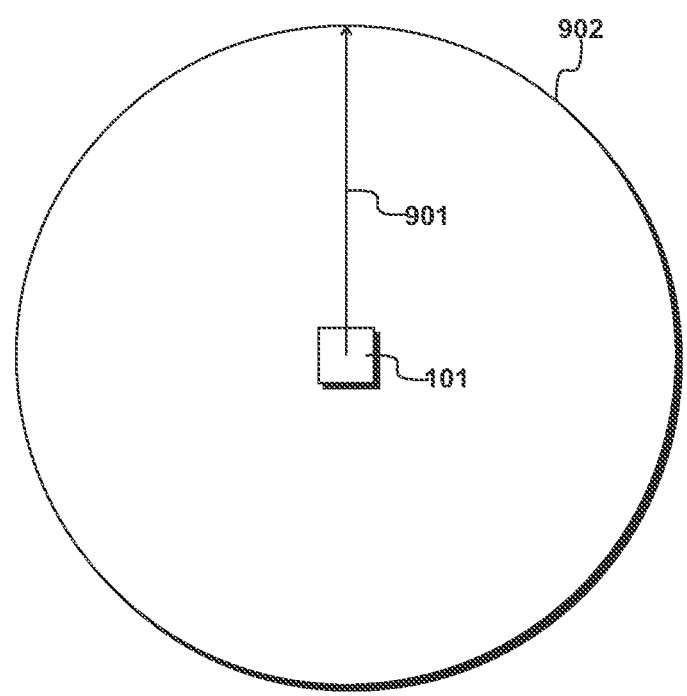
FIG. 9 shows an anchor assessing a distance to a mobile tag.

Anchor 101 is shown in FIG. 9, that is capable with communicating with the tags in the environment to assess distances between the anchor and the tags. The actual location of a tag is unknown and the objective is to locate the position of this mobile transceiver within the environment. Thus, for example, the environment itself may be a hospital or a care home with mobile transceivers attached to patients/residents. Alternatively, or in addition, mobile tags may be attached to particular assets, such that these assets may be located for maintenance purposes for example.

Radio transmissions used to assess distances are unidirectional, such that having identified a particular distance, this should be considered as a radius 901, indicating that a mobile tag may be located anywhere along circumference 902.

In an embodiment, distances have been assessed from range data derived from measuring return time of flight. However, the following approach for specifying actual positions are not restricted to the way in which the distance data is actually assessed. Thus, other techniques could be deployed, such as time of difference of arrival (TDOA) in which a tag would broadcast a signal and each anchor would record a time of arrival.

FIG. 10

Figure 10:
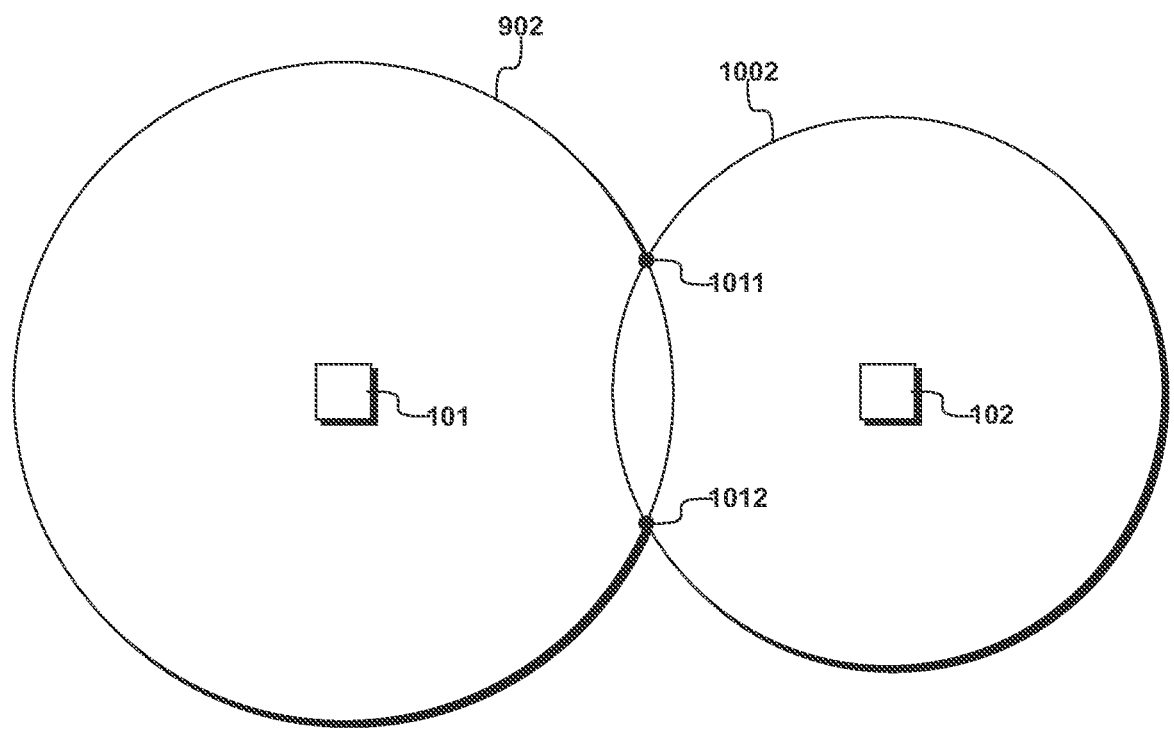
FIG. 10 shows a second anchor assessing the distance to the tag identified in FIG. 9.
Figure 11:
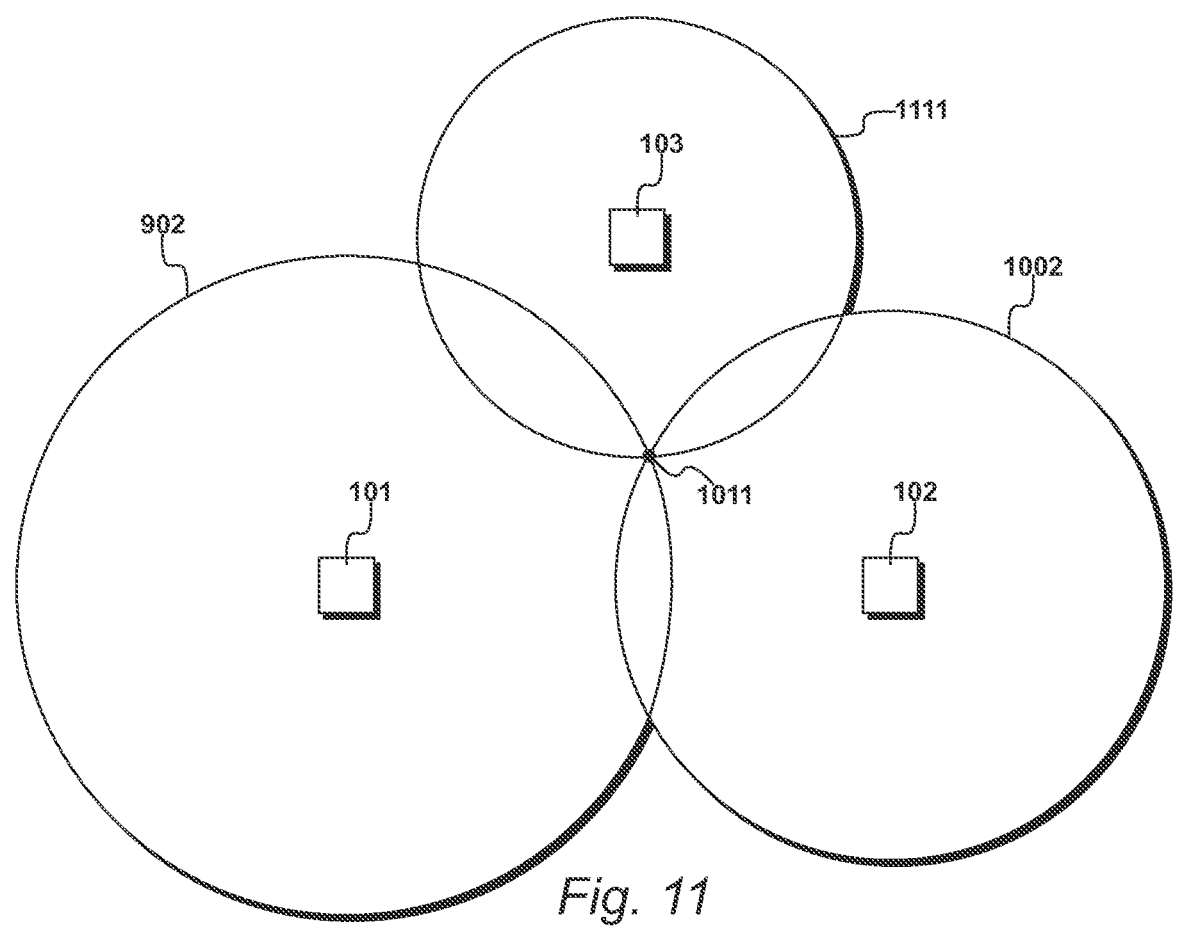
FIG. 11 shows the introduction of a third anchor.

The second anchor 102 is shown in addition to the first anchor 101 in FIG. 10. As previously described, anchor 101 has specified that the position of the tag is somewhere on circumference 902. In a similar way, the second anchor 102 has specified that the position of the tag is somewhere on a second circumference 1002. It may therefore be assumed that the tag should be located where the circles intersect. Thus, the tag should be located at a first position 1011 or at a second position 1012.

FIG. 11

The introduction of a third anchor 103 results in the establishment of a third circumference, which intersects position 1011 and not position 1012. Thus, with these three anchors in place, it should be possible, in theory, to locate the tag at position 1011.

FIG. 12

Figure 12:
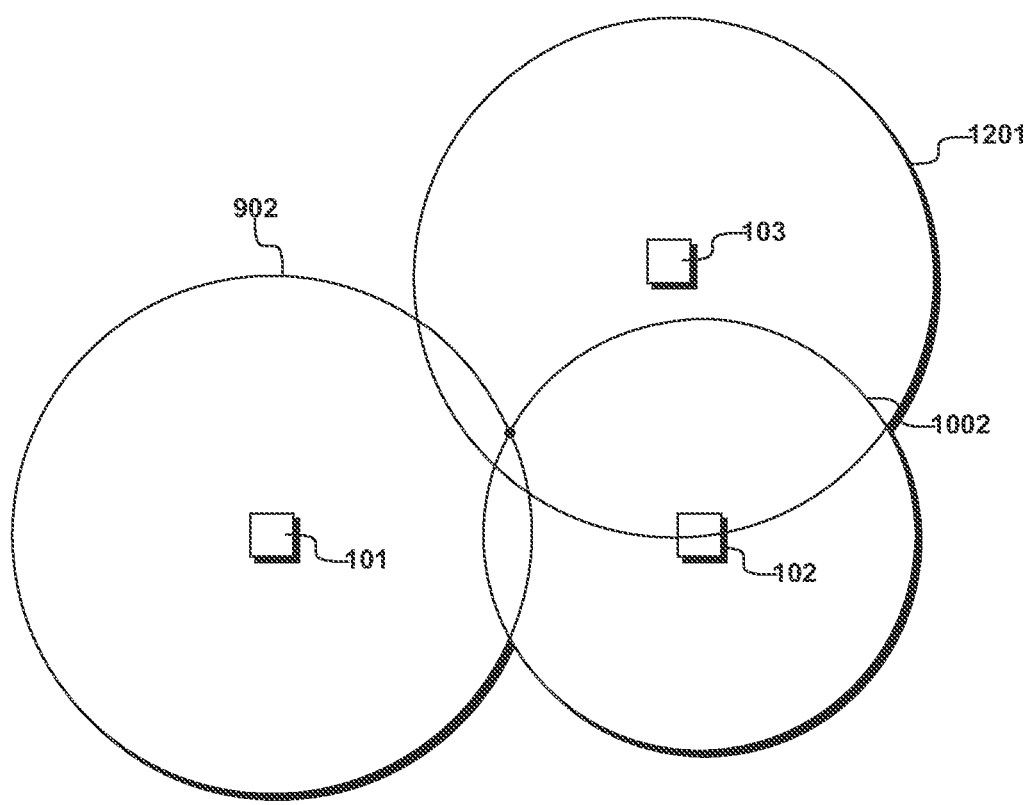
FIG. 12 illustrates data that includes errors.

In practice, the range data includes errors such that, as illustrated in FIG. 12, the provision of three anchors is unlikely to result in a clear identification of a single location. In this example, the third anchor 103 has assessed a distance that defines a circumference 1201, instead of circumference 1111, therefore a clear intersection of three circles does not exist. As previously described, errors of this type are introduced due to the presence of reflections and the inventors have realised that the averaging of bad data still results in the creation of bad data.

FIG. 13

Figure 13:
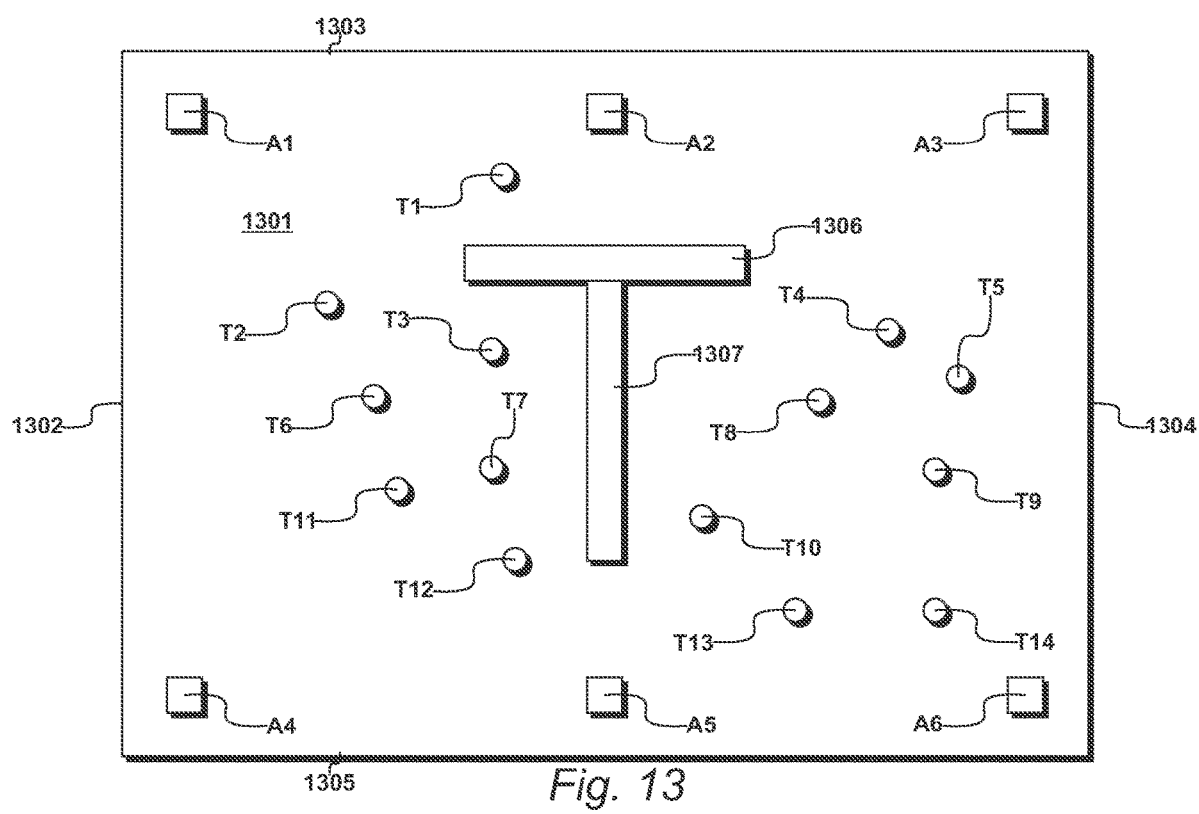
FIG. 13 illustrates an environment with six anchors.

An environment is illustrated in FIG. 13 in which six anchors A1 to A6 are attempting to locate the position of fourteen tags T1 to T14. Distancing data is assessed in accordance with procedures previously described. In this embodiment, radio transmissions from the tags T1 to T14 are minimised to conserve battery power. Whenever possible, transmissions are made by the anchors A1 to A6; therefore, it is the anchors that return ranging data to the network data processor 125. In an embodiment, similar radio protocols are used for both distance assessment and data transmission.

Within the environment of FIG. 13, problems of the type described with reference to FIG. 12 occur due primarily to reflections. These include reflections from a floor 1301 (and ceiling), external walls 1302, 1303, 1304, 1305 and internal walls 1306, 1307.

Data transmitted by the anchors are received by the network server 121 and data identifying specific distances are conveyed to the application server 124. During a complete cycle, distances will have been assessed between each anchor and each tag within the environment. The data is then supplied to the application server on an anchor-by-anchor basis.

FIG. 14

At the application server 122, tables are updated on a cycle-by-cycle basis, in response to the distancing data assessed by the anchors. In an embodiment, a first table 1401 is constructed for data received from the first anchor A1, a second table 1402 is constructed for data received from the second anchor A2, with similar tables 1403, 1404, 1405 and 1406 for data received from anchors A3 to A6 respectively.

Within each table, such as the first table 1401, distance values for each of the tags are recorded. Thus, the distance of the first tag T1 from the first anchor A1 is identified as distance D1. Similarly, the distance from T2 to A1 is identified as D2, with the distance from A1 to T3 being identified as D3 and so on, until the distance from the first anchor A1 to the fourteenth tag T14 is identified as D14.

Similarly, distances D15 to D28 are recorded for anchor A2, distances D29 to D42 are recorded for anchor A3, distances D43 to D56 are recorded for anchor A4, distances D57 to D70 are recorded for anchor A5 and distances D71 to D84 are recorded for anchor A6.

FIG. 15

The anchors are fixed and the tags are mobile in the environment, therefore it is the position of the tags that is of interest. To produce data relevant to the position of tags, an embodiment processes the data on a tag-by-tag basis.

In an embodiment, the data is rearranged with fourteen tag tables (as distinct from six anchor tables). Thus, in this example, with fourteen tags, fourteen tag tables are created, identified as 1501 to 1514.

FIG. 16

Figure 14:
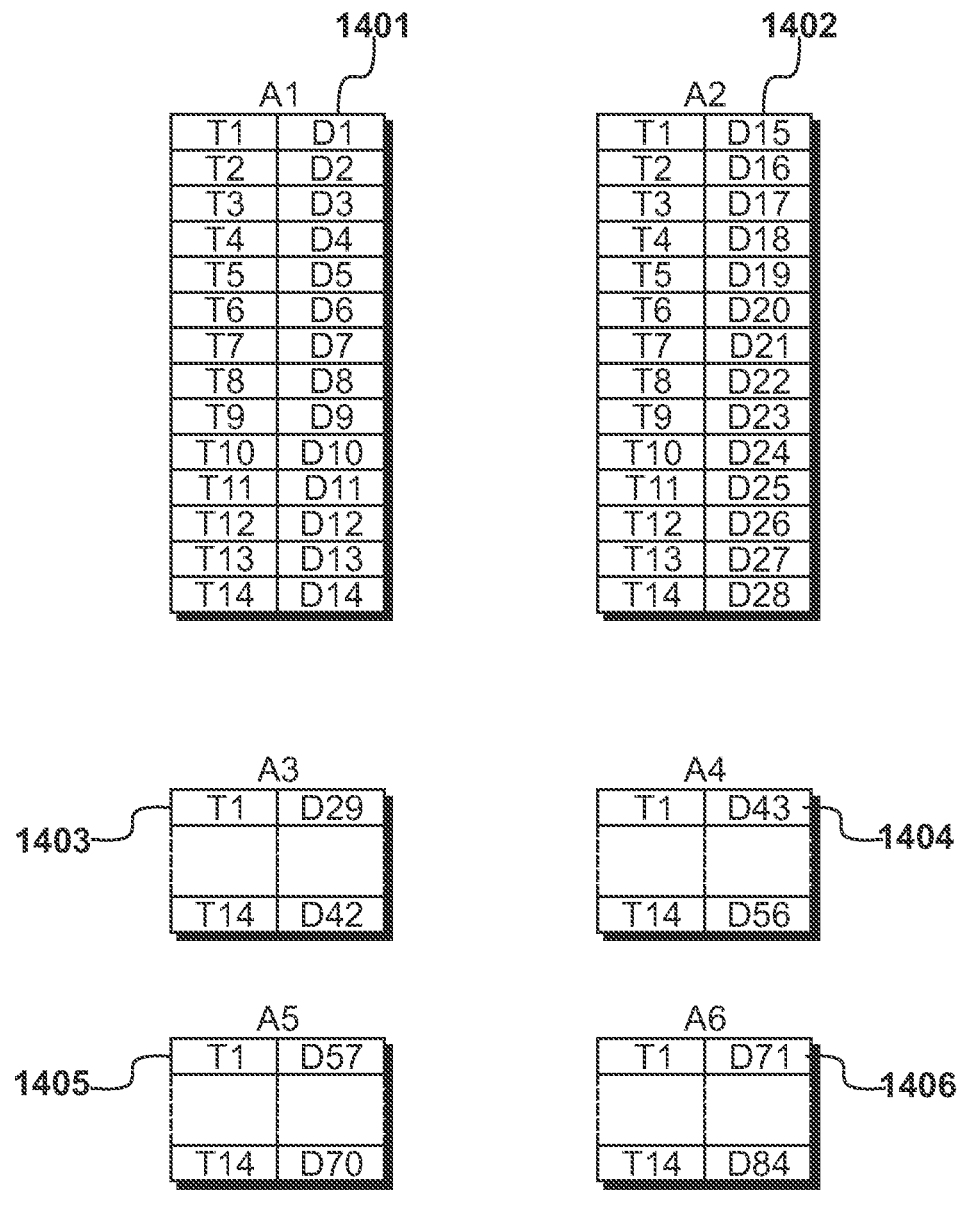
Figure 16:
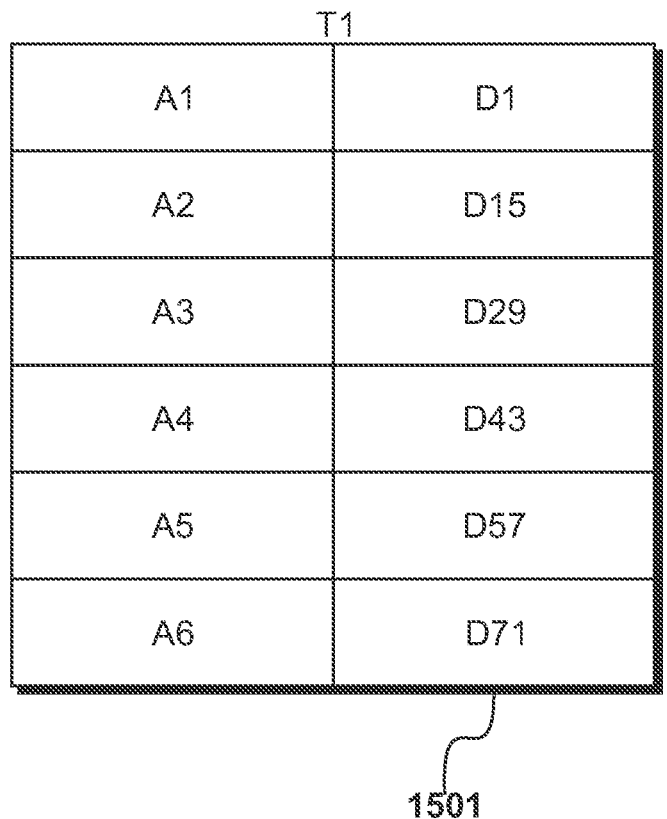
FIG. 16 details a table of the type shown in FIG. 15.

The first tag table 1501 is shown in FIG. 16. Data has been derived from all of the tables described with reference to FIG. 14. It therefore shows that the distance of tag T1 from anchor A1 is D1, the distance of this tag from the second anchor A2 is D15 and the distance of the first tag T1 from the third anchor A3 is D29. Similarly, the distance of the first tag T1 from the fourth anchor A4 is D43, the distance of the first tag T1 from the fifth anchor A5 is D57 and the distance of the first tag T1 from the sixth anchor A6 is D71.

From this data, giving an assessed distance of the first tag T1 from six anchors, the objective is to identify a single location for this first tag T1 within the environment of FIG. 13.

For the purposes of this example, the position of the tag T1 will be identified in cartesian coordinates. However, it should be appreciated that other coordinate systems may be adopted.

In an embodiment, positions may be defined in terms of absolute global locations, describing longitudes and latitudes.

As previously described, the assessed distancing data identifies distances in three-dimensional space. However, as previously described, differences in altitude (or in the Z dimension) may be ignored or a degree of compensation may take place, such that the coordinates are then located on a two-dimensional plane.

FIG. 17

Figure 15:
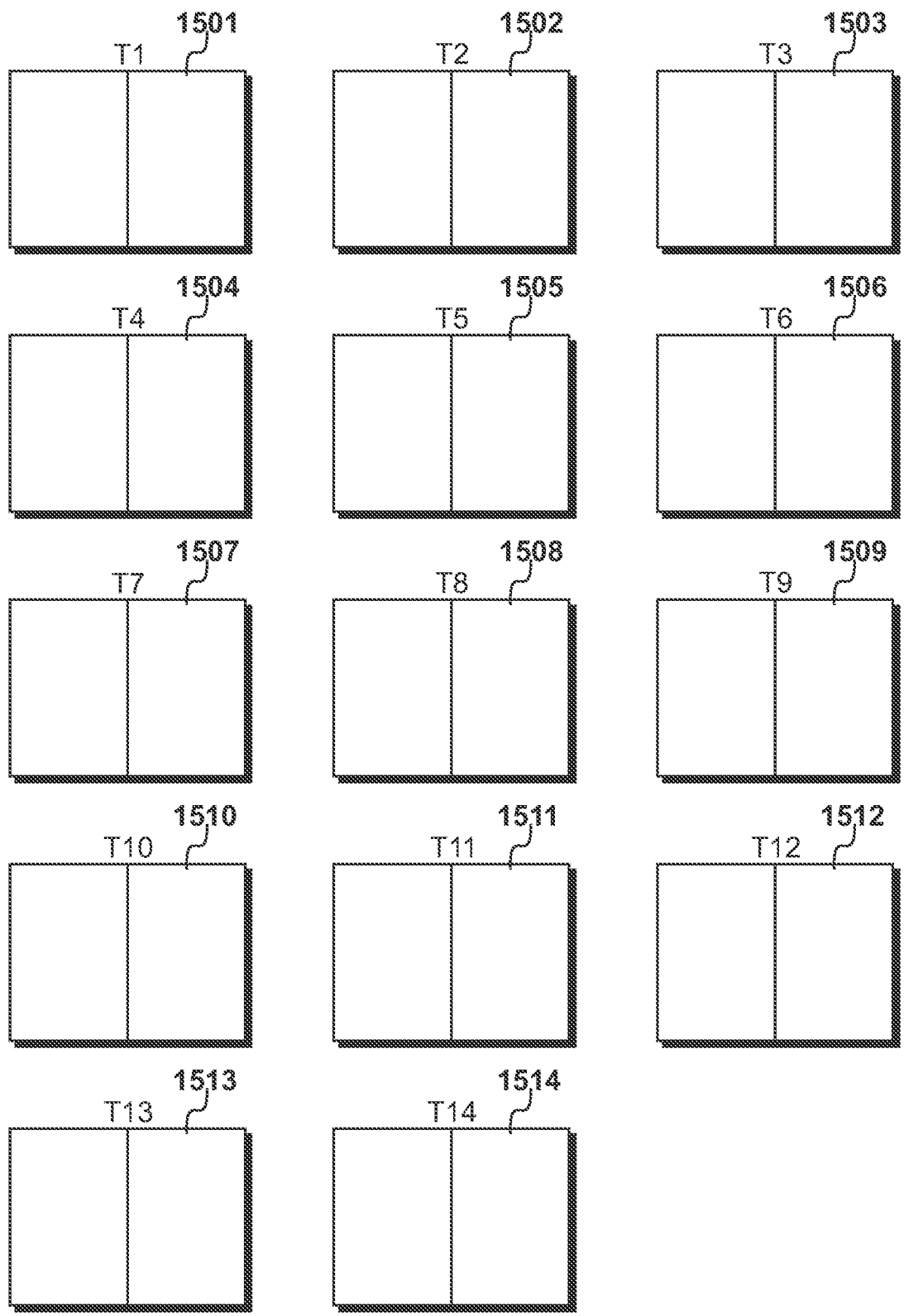
FIG. 15 illustrates data stored in tag related tables.
Figure 17:
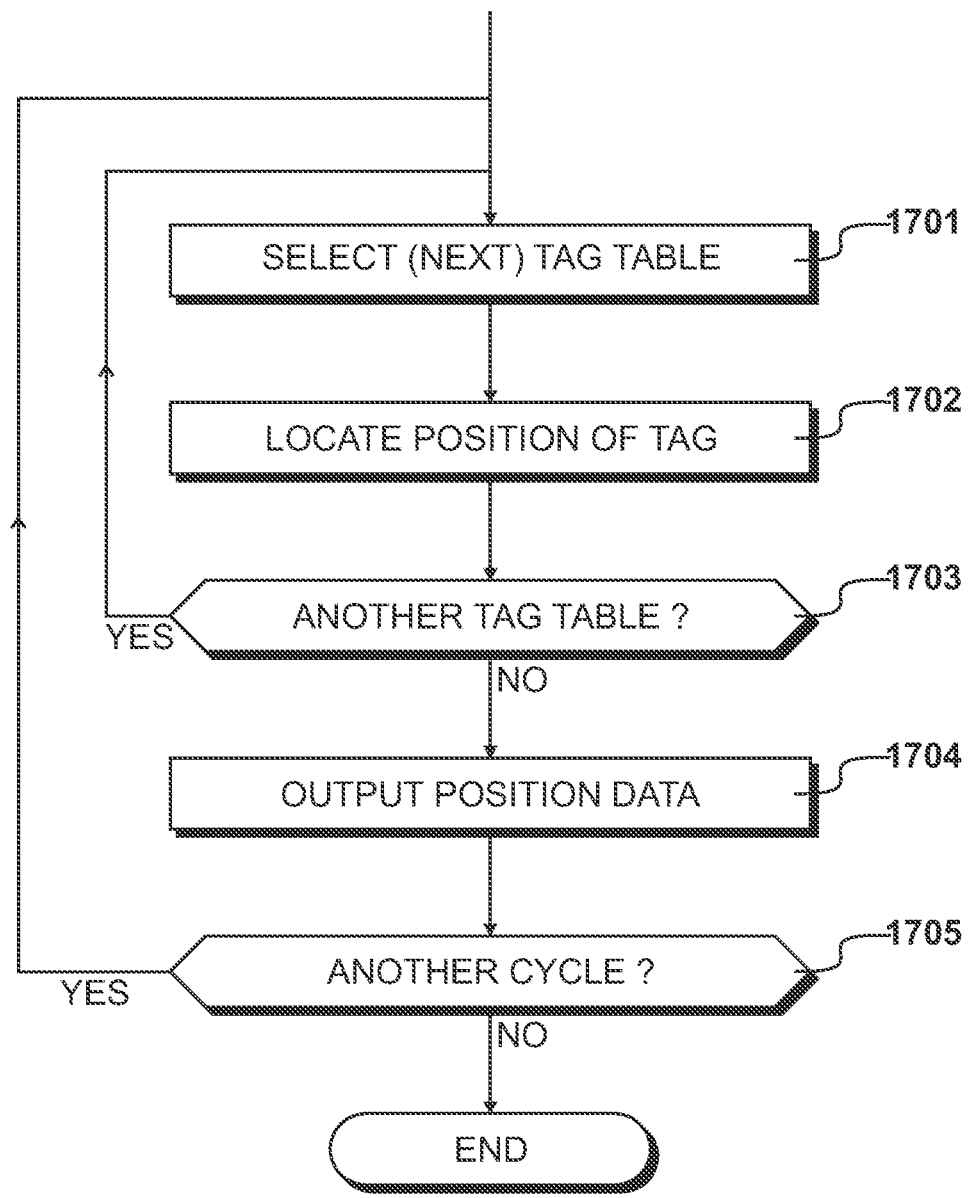
FIG. 17 illustrates a procedure for processing the data of FIG. 16.

Having arranged the data into tag tables, as described with reference to FIG. 15 and FIG. 16, in an embodiment, the application server 124 processes this data as shown in FIG. 17.

At step 1701, a tag table is selected which, on the first iteration, would be the first tag table 1501. At step 1702, the position of the tag is located within the environment whereafter at step 1703, a question is asked as to whether another tag table is to be processed. When answered in the affirmative, the next tag table is selected at step 1701. Eventually, all of the tag tables will have been considered and the question asked at step 1703 will be answered in the negative.

At step 1704, position data is produced as output data which may be stored and displayed graphically. At step 1705 a question is asked as to whether another cycle is to be executed and when answered in the affirmative, refreshed data will be selected at step 1701. Alternatively, in response to the question asked at step 1705 being answered in the negative, the procedure terminates.

FIG. 18

Figure 18:
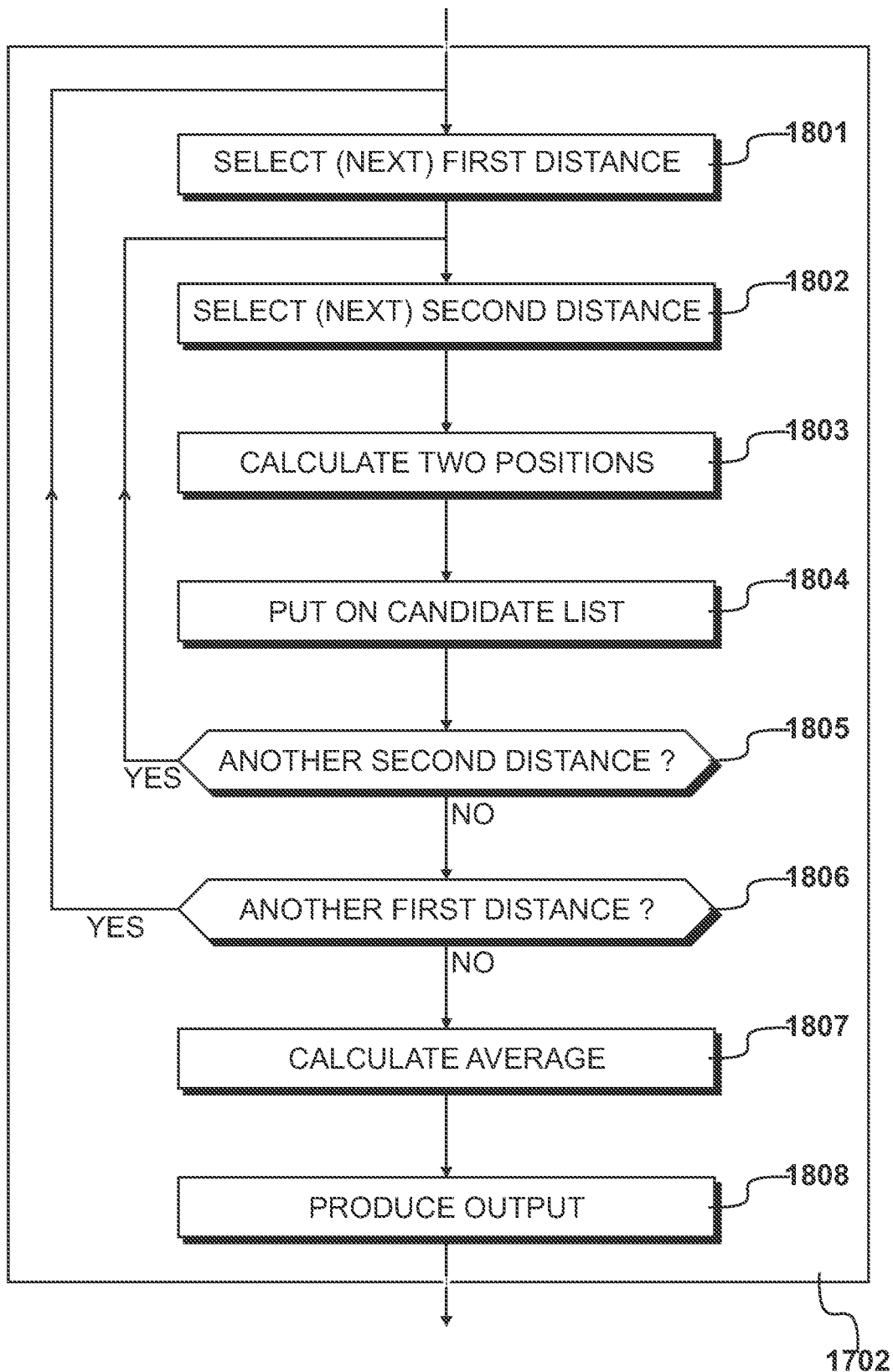
FIG. 18 details procedures for locating the position of a tag.

Procedures 1702 for locating the position of a tag are detailed in FIG. 18. This provides a method of specifying the location of a mobile transceiver, wherein the mobile transceiver communicates with a plurality of fixed transceivers. The distance of the mobile transceiver from each of the fixed transceivers is assessed by transmitting ranging radio signals. Each pair combination of fixed transceivers is then selected to identify the position of two intersections for each said selected pair. These identified positions are then processed to specify the location of the mobile transceiver.

At step 1801, a first distance is selected and at step 1802 a second distance is selected. From these two distances, representing the distance of the selected tag from a first anchor and a second anchor, two positions are calculated at step 1803. These two positions are then placed on the candidate list at step 1804.

At step 1805, a question is asked as to whether another second distance is to be considered and when answered in the affirmative, the next second distance is selected at step 1802. Procedures 1803 and 1804 are repeated, allowing the next second distance to be selected at step 1805. This continues until all of the second distances have been considered, resulting in the question asked at step 1805 being answered in the negative.

A question is then asked at step 1806 as to whether another first distance is to be considered. Thus, when answered in the affirmative, control is returned to step 1801 allowing the next first distance to be considered. The next second distance is selected at step 1802 and again two positions are calculated at step 1803, resulting in these positions being placed on the candidate list at step 1804.

Procedures continue until all available pair combinations have been selected, resulting in the identification of respective positions where the circles defined by these distances result in two intersections occurring.

At step 1807, an average position is calculated based on all of the positions that have been placed on the candidate list at step 1804. An output is then produced at step 1808.

FIG. 19

Figure 19:
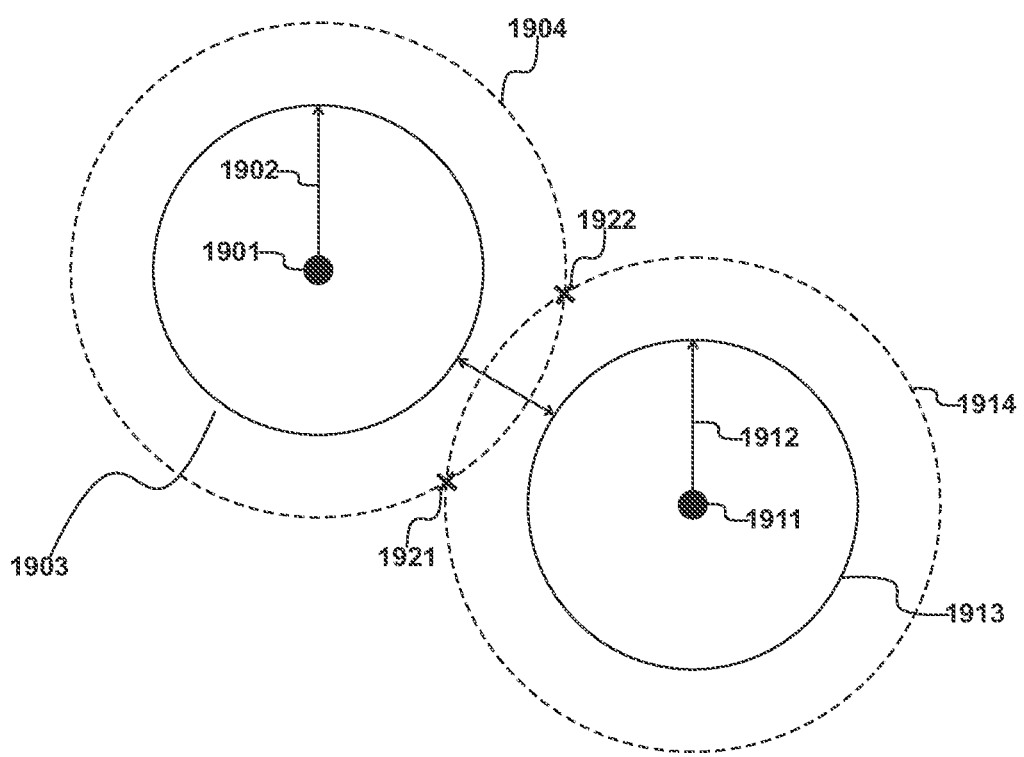
FIG. 19 illustrates a scaling operation.

When a pair combination of fixed transceivers is selected, circles defined by distances to the tag under consideration should result in two intersections. However, on some occasions, the resulting circles do not intersect. A situation of this type is illustrated in FIG. 19. A first anchor 1901 assesses a distance 1902 to a tag, such that the position of the tag should lie on circle 1903. Similarly, a second anchor 1911 assesses the tag to be at a distance 1912, such that the tag should be located on circle 1913. As shown in FIG. 19, circle 1903 does not intersect with circle 1913. To overcome this problem, distances of this type that do not intersect are identified and a scaling operation is performed, resulting in at least one of the identified distances being scaled to create two forced intersections. In an embodiment, both distances are scaled. This results in circle 1903 being scaled up to circle 1904 and circle 1913 being scaled up to circle 1914. This in turn results in the creation of a first intersection 1921 and a second intersection 1922.

FIG. 20

A candidate list, of the type populated at step 1804, is shown in FIG. 20. This has been produced for the first tag T1 after this tag has been selected at step 1701. Thereafter, a first range from the first anchor A1 is selected at step 1801 and a second range from the second anchor A2 is selected at step 1802. This results in a first position X1, Y1 being put on the candidate list at step 1804, followed by a second position X2, Y2. The question asked at 1805 is then answered in the affirmative, resulting in the third anchor A3 being selected and positions X3, Y3 and X4, Y4 being placed on the candidate list.

Similar procedures are repeated for the first anchor and the fourth anchor, followed by the first anchor and the fifth anchor and the first anchor and the sixth anchor, thus placing positions X9, Y9 and X10, Y10 on the candidate list. The question then asked at step 1805 will be answered in the negative, resulting in the next first range being selected at step 1801. Thus, this results in the distance for the second anchor A2 being selected at step 1801 and the distance for the third anchor A3 being selected at step 1802. This in turn results in positions X11, Y11 and X12, Y12 being placed on the candidate list.

The process continues until positions defined by ranges from the fifth anchor A5 and the sixth anchor A6, such that positions X29, Y29 and X30, Y30 are placed on the candidate list. All of the X coordinates are then averaged with a similar averaging being performed with respect to the Y coordinates, resulting in an average X, Y position.

FIG. 21

Figure 21:
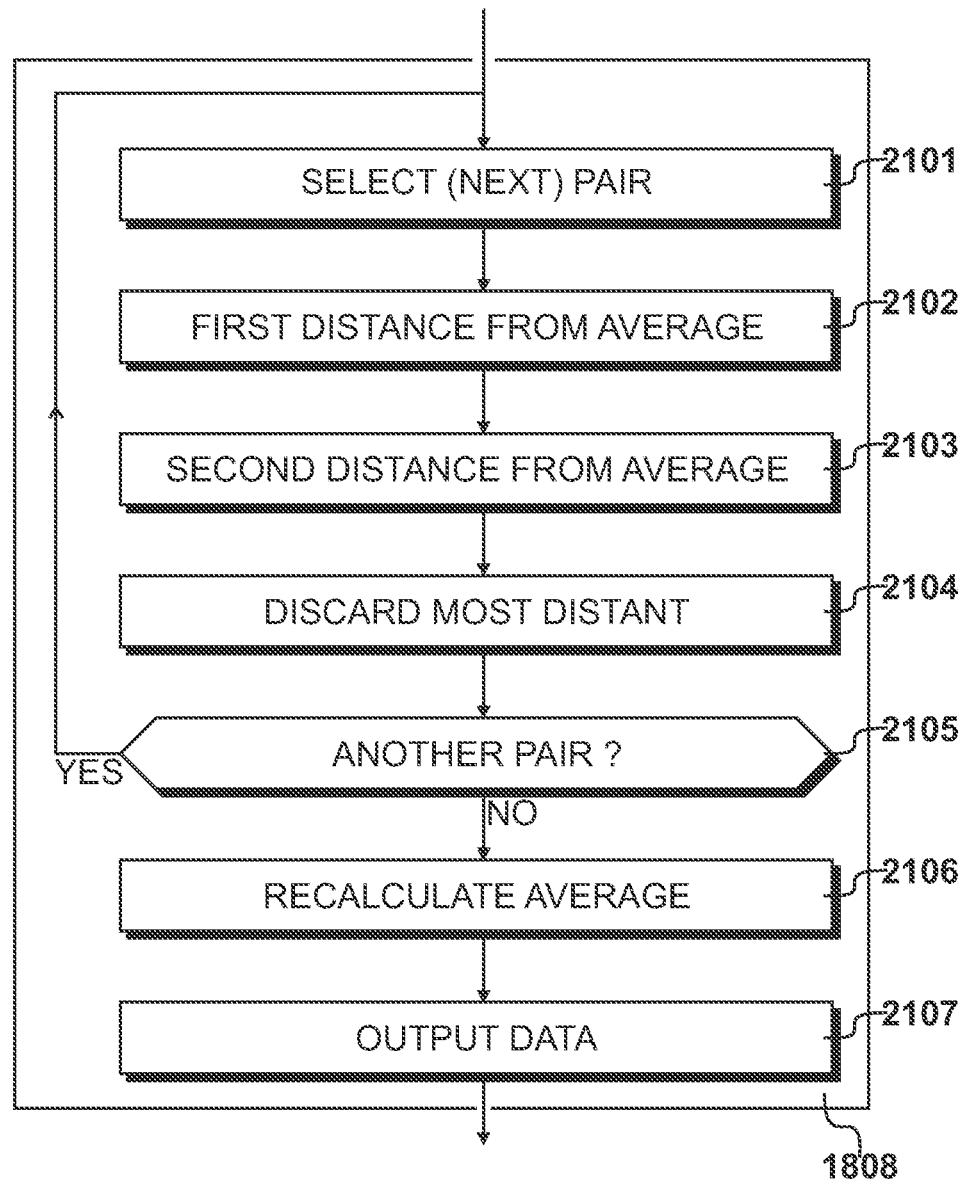
FIG. 21 illustrates procedures for outputting position data.

An example of the procedures 1808 for outputting position data are detailed in FIG. 21. In this embodiment, the procedures determine the displacement of each position from the previously calculated average location. For each of the two positions derived from a pair combination of fixed transceivers, the position most displaced from this average is discarded, while the remaining position is retained. Thus, each pair combination of anchors originally produced two candidate positions but this is now reduced to one candidate position per pair of fixed anchors. From these positions a recalculated average location is calculated.

At step 2101, a pair is selected. Thus, if a first selection is made, this would result in anchor pair A1, A2 being selected. At step 2102, the first distance from the average is determined and at step 2103 the second distance from the average is determined. At step 2104 the most distant of the first distance and the second distance the average is discarded.

Thereafter, at step 2105 a question is asked as to whether there is another pair and upon being answered in the affirmative, the next pair is selected at step 2101. Thus, in the example, this would result in anchor pairs A1, A3 being selected. Procedures continue until all of the anchor pairs have been selected, up to A5, A6 in the example, resulting in the question asked at step 2105 being answered in the negative.

At step 2106 an average is recalculated from the remaining positions and this recalculated average can result in the production of output data at step 2107.

FIG. 22

Figure 22:
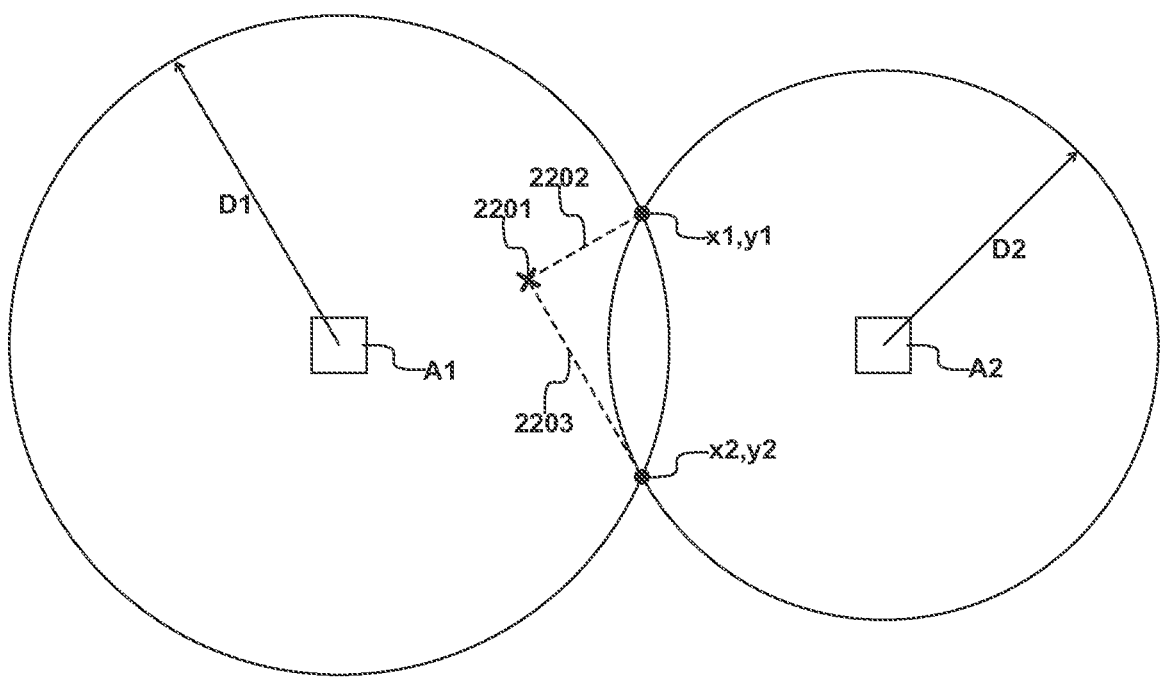
FIG. 22 illustrates position selection.

The procedures described with reference to FIG. 21 are illustrated in FIG. 22. For the first tag T1, the first anchor A1 has produced a first distance D1 and the second anchor A2 has produced a second distance D2. The intersections of the resulting circles result in the identification of a first position X1, Y1 and a second position X2, Y2.

From all of the candidate positions, an average position was calculated at step 1807, identified as average position 2201. The displacement of the first position X1, Y1 from the average position is shown at 2202 and the displacement of the second position X2, Y2 from the average position is shown at 2203. Distance 2203 is larger than distance 2202, therefore the second position X2, Y2 is discarded and the first position X1, Y1 is retained.

FIG. 23

Procedure 2104 is repeated for each candidate pair, resulting in one position for each pair being discarded. Thus, as illustrated in FIG. 23, locations X1, Y1; X3, Y3; X6, Y6 and so on have retained as candidate locations.

FIG. 24

Procedures 1808 for producing output data may include further refinements to improve the accuracy of locating the position of a particular tag. Furthermore, as procedures of this type are conducted, it is possible to determine the quality of the resulting output data. Thus, if quality continues to improve, further procedures may be conducted or repeated. Furthermore, this process may continue until a further iteration results in a reduction in the measured quality, at which point the previously calculated value is accepted as being the most accurate that can be determined from the data available.

Figure 24:
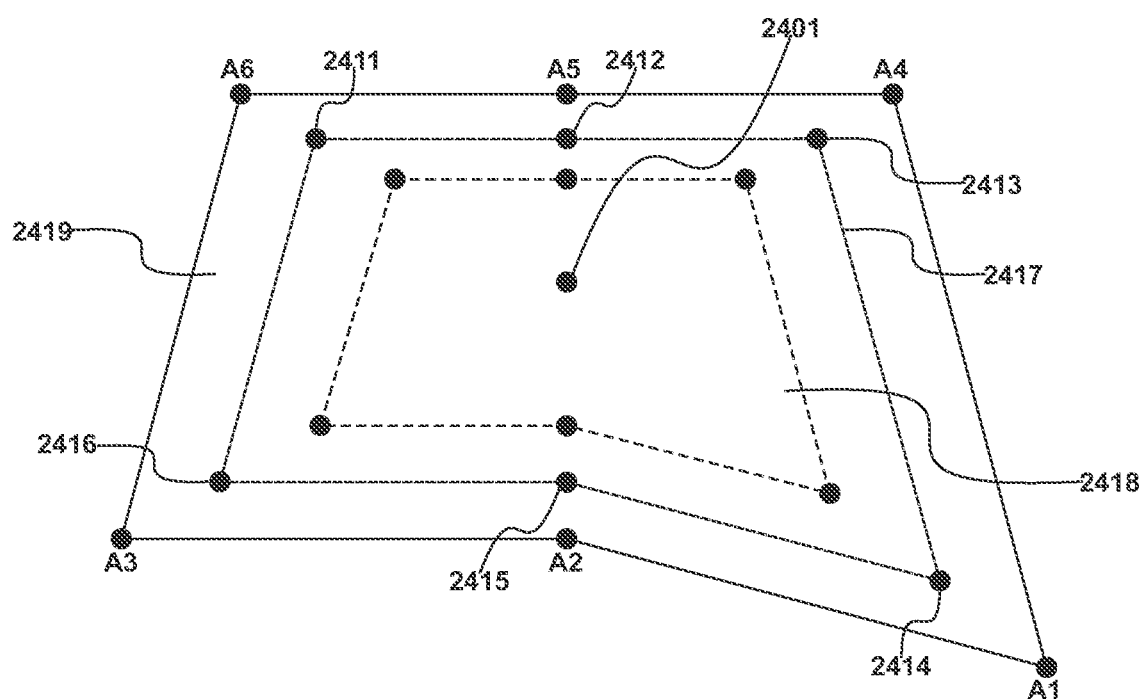
FIG. 24 illustrates an assessment of quality.

As illustrated in FIG. 24 for a particular tag, data is available with respect to many anchors. In this example, data is available from six anchors which have been identified as A1 to A6. From these positions, an average value 2401 has been calculated.

For the purposes of this Illustration, it may be assumed that specific locations were identified at positions 2411, 2412, 2413, 2414, 2415 and 2416. These positions surround the average position 2401 and may be considered to define a region 2417.

The average position 2401 also lies within a similar smaller region 2418, for which the defining points are closer to the average 2401 than for the larger region 2417. Greater distance from the average position represents lower quality, which may also be identified as lower confidence. Thus, it is possible to produce a figure of confidence by referring to the size of the enclosing region or to the extent to which the remaining candidate locations are displaced from the updated average location.

When considering subsequent iterations, resulting in some of the candidate locations being removed, better qualities are achieved if the surrounding region shrinks. Similarly, procedures to remove candidate locations should terminate if a surrounding region starts to get larger.

In terms of conducting further iterations with a reduced data set, the process continues with the aim of improving overall quality, as measured by the closeness of the candidate positions to their collective average. In addition, location output data is produced from the average location if the remaining data has been obtained from less than four fixed transceivers.

With more than four fixed transceivers remaining in the data set, it is possible to further remove candidate positions to leave remaining candidate positions and then further calculate a remaining average location. Further assessment is then made of the extent to which each remaining candidate position is displaced from the remaining average location to produce a second measure of quality.

As measures of quality continue to be produced, an embodiment compares a second measure of quality against a first measure of quality to identify which is better. Location output data is produced based on the average of the remaining positions if the second measure of quality is better than the first measure of quality. Alternatively, location output data is produced from the updated average location (that is, from the previous iteration) if the first measure of quality is better than the second measure of quality.

To improve accuracy, it is possible to compensate the measured distances with reference to calibrated fixed transceiver to fixed transceiver measurements.

FIG. 25

In a further approach to achieving greater refinement, in an embodiment, it is possible to identify a particular anchor that continues to produced erroneous results. In the environment previously described, an assessment may determine that the first anchor A1 continues to produce results that are seen as being significantly far away from the average position 2401. Consequently, in this embodiment, all ranging data derived from anchor A1 is discarded, resulting in a refined candidate table as shown in FIG. 25. In this, the number of candidate locations available has been reduced.

The retained positions are again considered with reference to a new average location which, if producing a higher quality, allows an output location to be produced that is more accurate.

FIG. 26

In an environment with many anchors and very many tags, it is necessary to provide a sophisticated schedule to optimise the available radio transmission capabilities. As previously described with reference to FIG. 1, an embodiment operates within a LoRa radio network deploying established protocols.

The schedule instructs anchors to communicate with tags at specified points in time by being synchronised to a GPS clock signal, or to another reliable clock signal source, such as from a dedicated centralised network. As previously described, many ranging operations are performed by each anchor, from which, distances to each tag are assessed. This distance data is conveyed to the application server. The application server then processes many of these distances to identify many candidate positions. These candidate positions are then processed to specify tag locations.

The scheduling operations maintain compatibility with LoRa protocols and the transceivers (anchors and tags) operate as class B devices. The network server, providing a gateway to the application server, produces a beacon that is transmitted every one-hundred-and-twenty-eight seconds, synchronised to GPS time (or another reliable clock signal source). The transceivers align their reception windows to ping slots that are determined by the gateway, such that they each activate their receivers to receive packets from the gateway during these ping slots.

The tag transceivers are in-active for as long as possible to reduce power consumption. Thus, the tags are instructed to change their behaviour (to become active) only during these ping slots. This allows complex schedules to be constructed, allowing thousands of tags to be located. Thus, the LoRa network provides a communications gateway to the application server and facilitates the location of tags within the environment.

The available time is divided into slots. In accordance with the LoRa protocol, after a device has transmitted, a period of time then elapses to present two receive windows. Thus, if an anchor produces distance data and sends this data to the network data processor, the anchor must then wait until the two receive windows have passed before the anchor is then free to assess distance data for another tag. In practice, a ranging operation could take seven-hundred-and-fifty milliseconds (750 ms) with a following data transmission operation that could then take three seconds, taking account of the data transmission window and the receive windows. Thus, under this established regime, an anchor can only generate data every 3.75 seconds.

Figure 26:
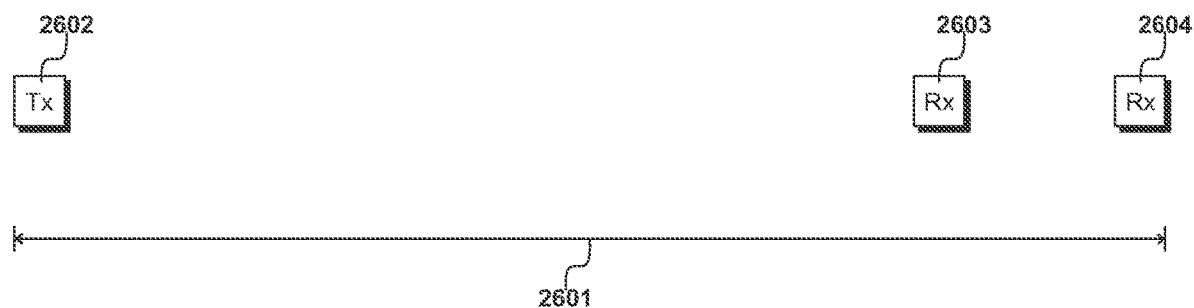
FIG. 26 shows a transfer time slot.

A transfer time slot 2601 is shown in FIG. 26. Within this time slot, there is a transmit window 2602, followed by a first receive window 2603 and a second receive window 2604. For the purposes of this deployment, the receive windows 2603 and 2604 are not required. However, provision is made for these within the transfer time slot 2601 to maintain compatibility with the established LoRa radio environment.

In an embodiment, the transfer of distance data does not interfere with ranging exchanges because the data transfer will take place using a different frequency and/or spreading factor. However, a conventional transfer time slot, as shown in FIG. 26, includes approximately two seconds of dead time.

FIG. 27

For the purposes of this illustration, it may be assumed that an environment has four anchors (A1 to A4) and four tags (T1 to T4). To provide the application server 124 with all of the available distance values relating to the first tag, in a known regime, it would be necessary to include a first transfer time slot 2701, followed by a second transfer time slot 2702, a third transfer time slot 2703 and a fourth transfer time slot 2704.

FIG. 28

Figure 27:
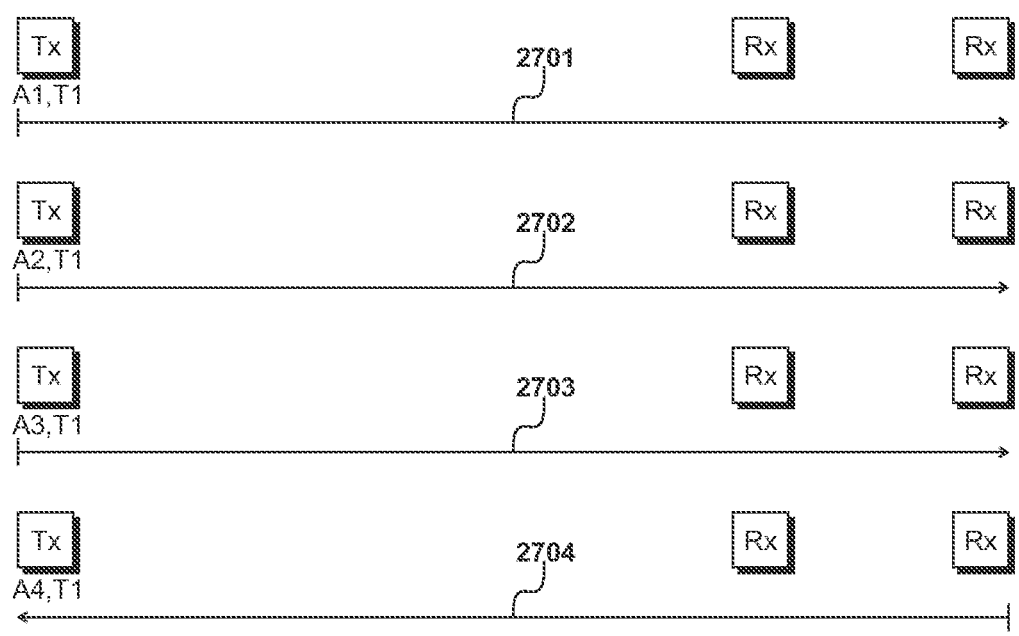
FIG. 27 shows additional transfer time slots.
Figure 28:
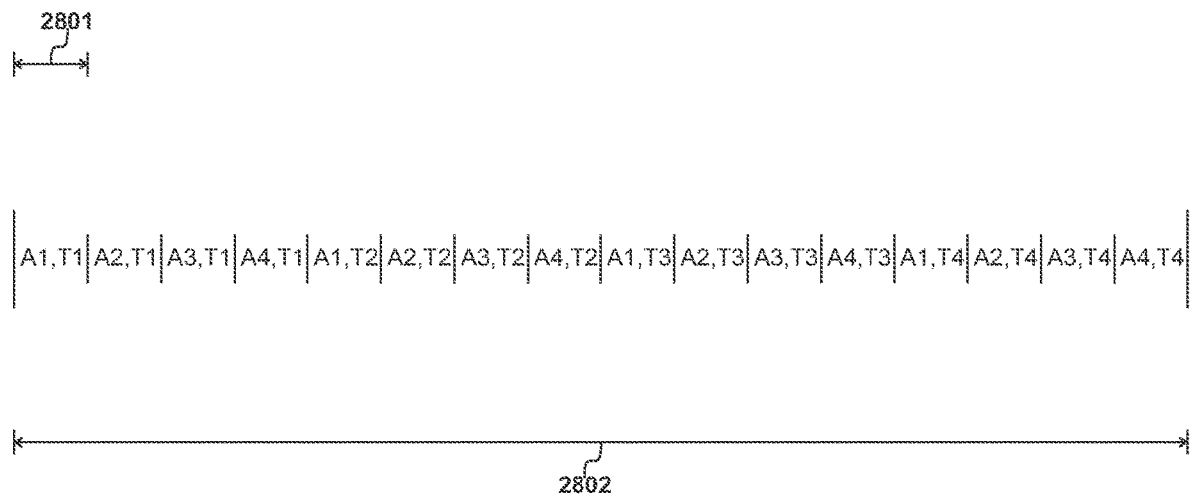
FIG. 28 shows a complete cycle of sixteen transfer time slots.

The procedure described with reference to FIG. 27, relating to the first tag, must be repeated for all of the tags, as illustrated in FIG. 28. This requires a total of sixteen transfer time slots, each having a duration identified at 2801. The complete cycle duration is therefore identified at 2802.

FIG. 29

Figure 29:
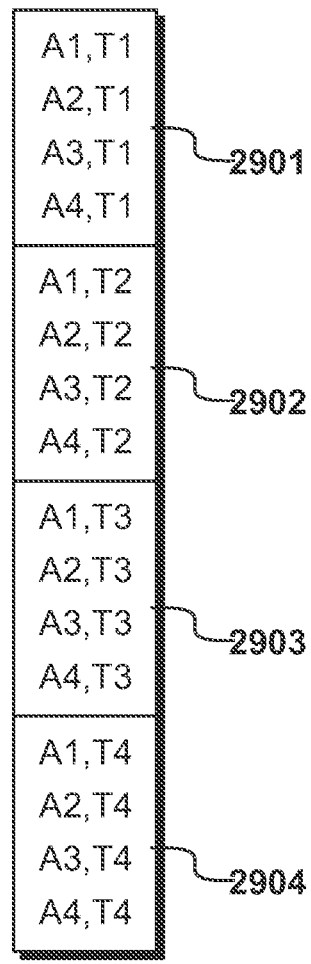
FIG. 29 shows blocks of transferred data.

The resulting data transmitted to the application server 124, via the network server 123, is shown in FIG. 29. A first block 2901 identifies distances between the anchors to the first tag T1, a second block 2902 identifies distances between the anchors and the second tag T2, a third block 2903 identifies distances between the anchors and the third tag T3, with a fourth block 2904 identifying distances between the anchors and the fourth tag T4. From this, it is possible for the application server 124 to construct the candidate table described with reference to FIG. 20.

FIG. 30

An objective is to reduce the cycle duration below that indicated at 2802. A method is provided for transmitting data over a radio network, in which a fixed transceiver transmits distance data to a network data processor, where the fixed transceiver is required to wait after a transmission to maintain network compatibility.

The inventors have appreciated that more than one set of results can be transmitted during a transmission window, such as transmission window 2602. Consequently, the method collects bulk distance data for a plurality of mobile transceivers during a ranging time slot. The bulk distance data is then transmitted in a transfer time slot, while maintaining network compatibility.

Figure 30:
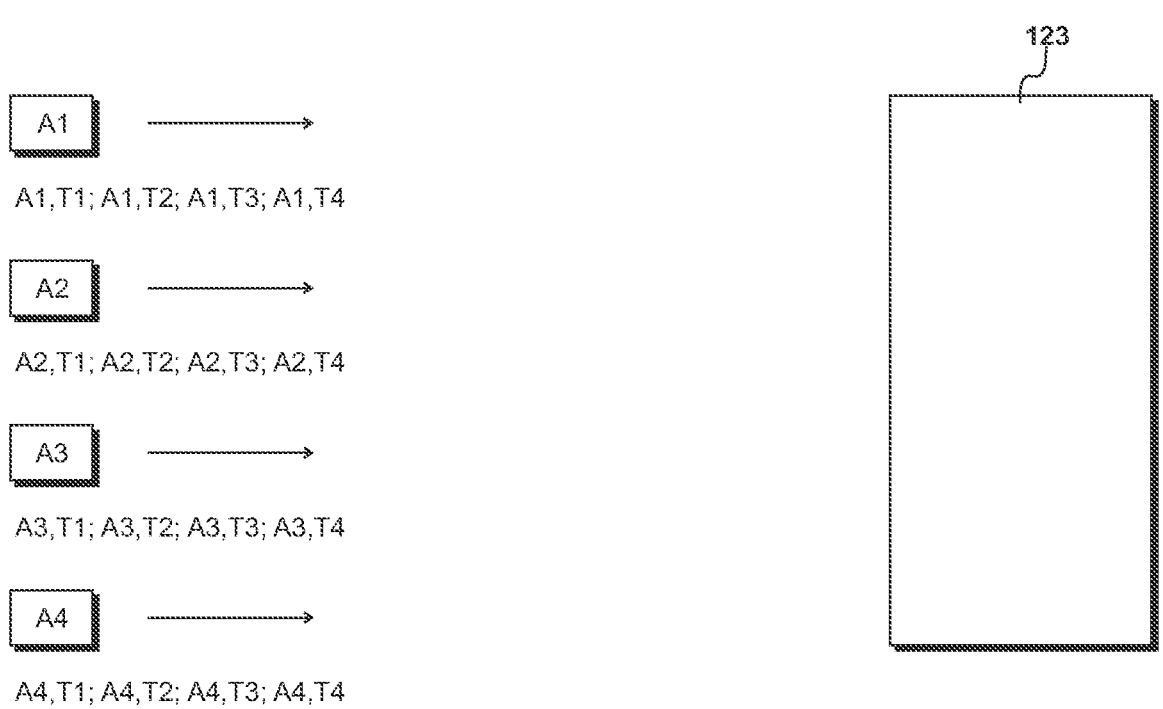
FIG. 30 shows bulk data for transfer.

As illustrated in FIG. 30, in an embodiment, multiple ranging operations are performed by each anchor to assess distance data for a plurality of tags. In a specific example, the first anchor A1 assesses a distance to the first tag T1, followed by the second anchor T2 assessing a distance to the first tag T1, the third anchor A3 assessing a distance to the first tag T1 and the fourth anchor A4 assessing a distance to the first tag T1. Similarly, the first anchor A1 then ranges the second tag T2, the second anchor A2 ranges the second tag T2, the third anchor A3 ranges the second tag T2 and the fourth anchor A4 ranges the second tag T2. These procedures are then repeated for the third tag T3 and the fourth tag T4.

In this embodiment, the procedure then enters a results transfer phase, allowing the anchors to transfer the bulk distance data, as an alternative to transmitting the distances individually, as described with reference to FIGS. 26 to 28.

As shown in FIG. 30, the first anchor A1 now has bulk distance data for a plurality of mobile transceivers for transmission to the network data processor 125. Each anchor includes bulk distance data for each of the four mobile tags T1 to T4.

FIG. 31

Figure 31:
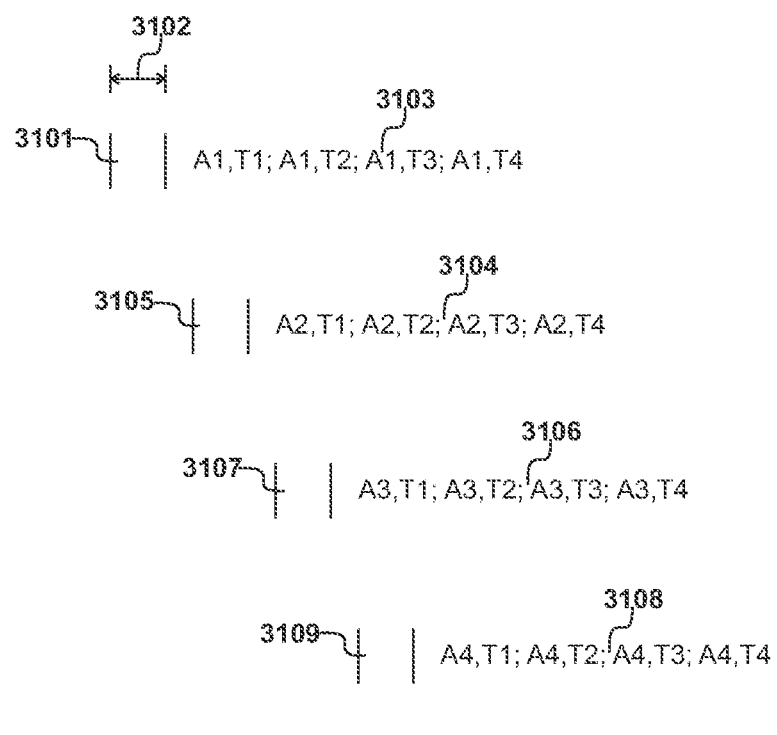
FIG. 31 shows a first embodiment for the transfer of bulk data.

A transfer time slot 3101 is shown in FIG. 31. This has a duration indicated as 3102, that is substantially similar to the duration of transfer time slot 2601. However, during time slot 3101 bulk distance data is transmitted, as shown at 3103, identifying distances between anchor A1 and tag T1, tag T2, tag T3 and tag T4.

In this embodiment, each fixed transceiver initiates the transmission of bulk distance data in a subsequent transfer time slot, after the completion of the previous transfer time slot. Thus, the second anchor A2 transmits bulk distance data 3104 during a transfer time slot 3105, followed by the third anchor A3 transmitting bulk distance data 3106 during time slot 3107, followed by the fourth anchor A4 transmitting distance data 3108 during transfer time slot 3109.

All of the distance data has been transmitted in four transfer time slots and the complete cycle duration is identified at 3110. Cycle duration 3110 identified in FIG. 31, is therefore substantially shorter than the cycle duration 2802 identified in FIG. 28.

FIG. 32

Figure 32:
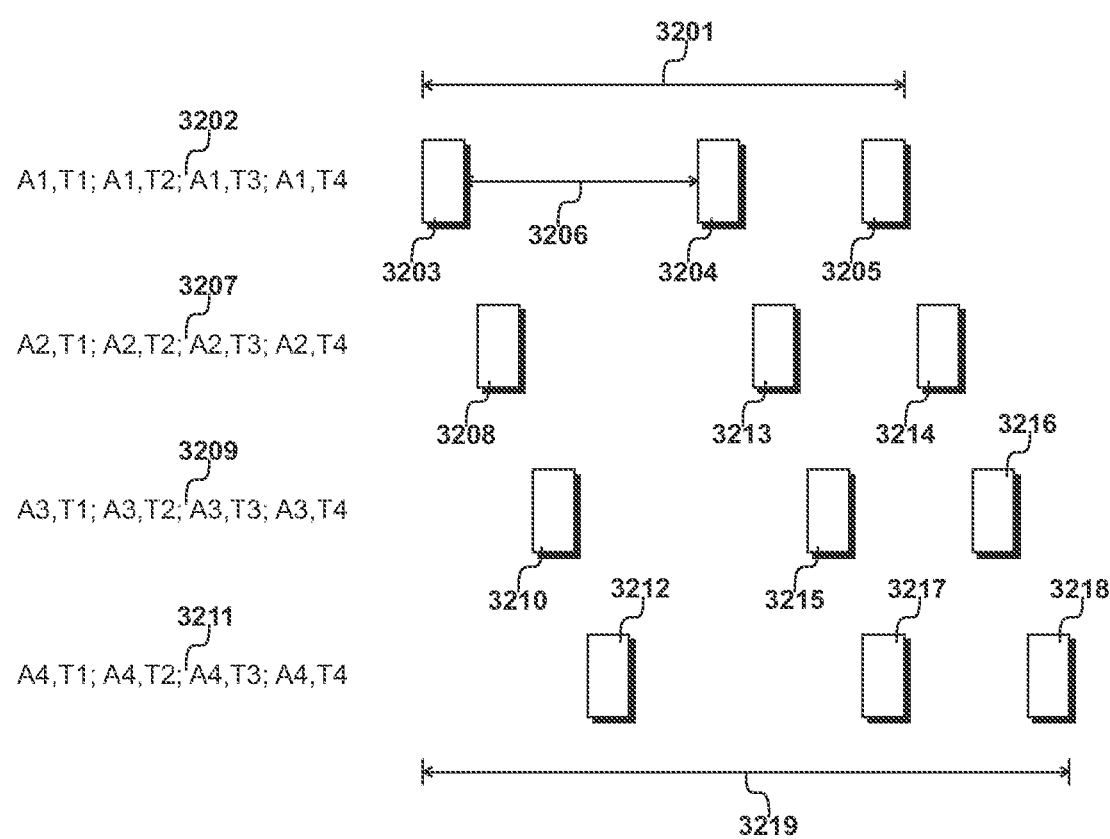
FIG. 32 shows a second embodiment for the transfer of bulk data.

An alternative embodiment is illustrated in FIG. 32. In the embodiment described with reference to FIG. 31, the transfer of data from, say, the second anchor A2 cannot be initiated until after the completion of the previous transfer time slot, transferring data from the first anchor A1. However, the inventors have appreciated that although more data is being transmitted during each transfer time slot, the resulting time slots still include dead time, that occurs after the data transmission has taken place but before the first window for receiving data has opened.

In FIG. 32, transfer time slot 3201 is identified, that is substantially similar to time slot 3102. Distance data 3202 is transmitted from the first anchor A1 during a transmit window 3203. This is then followed by a first receive window 3204 and a second receive window 3205, to maintain compatibility.

During interval 3206, the first anchor A1 is not transmitting data. The embodiment of FIG. 32 makes use of this interval. Thus, during interval 3206, the second anchor A2 transmits distance data 3207 during a second transmit window 3208, the third anchor A3 transmits distance data 3209 during a third transmit window 3210 and the fourth anchor A4 transmits distance data 3211 during a fourth transmit window 3212. It can therefore be seen that each fixed transceiver initiates the transmission of bulk data during the same transfer time slot.

It can also be seen from FIG. 32 that the transmission of bulk distance data from a plurality of fixed transceivers is completed before a receive window 3204 within the transfer time slot is encountered.

Furthermore, each transmission must be followed by its own receive window. Thus, a second transmit window 3208 is followed by a third receive window 3213 and a fourth receive window 3214. Similarly, a third transmit window 3210 is followed by a fifth receive window 3215 and a sixth receive window 3216. Again, the fourth transmit window 3212 is followed by a seventh receive window 3217 and an eighth receive window 3218. However, given that the second transmit window 3208 occurs after the first transmit window 3203, the receive windows 3213 and 3214 are equally offset, thereby occurring after receive window 3204 and receive window 3205 respectively.

A similar situation occurs with receive window 3215, which occurs after receive window 3213; and receive window 3217 which occurs after receive window 3215. Similarly, receive window 3216 occurs after receive window 3214 and receive window 3218 occurs after receive window 3216.

The end of receive window 3218 represents the end of the complete cycle, having a duration identified as 3219. Thus, the cycle duration has been reduced again, with duration 3219 being shorter than duration 3110.

The invention claimed is:

1. A method of assessing distances between a first transceiver and a second transceiver by measuring a round trip time of flight of a transmitted radio signal, comprising the steps of:
    evaluating an intensity of a received radio signal;
    increasing transmitter power if said intensity is below a first threshold; and
    decreasing said transmitter power if said intensity is above a second threshold, to reduce an introduction of ranging errors due to automatic step changes being made to input amplification.

2. The method of claim 1, further comprising the steps of:
    assessing distance by performing a plurality of ranging transmissions during a ranging interval; and
    using mutually different transmission characteristics, said characteristics non-exclusively selected from a list including frequency and phase polarization.

3. The method of claim 1, wherein said evaluating step further comprises the steps of:
    obtaining a signal strength indication for each ranging transmission during a distancing assessment; and
    averaging said obtained signal strength indications to produce said intensity for said assessed distance.

4. The method of claim 1, further comprising the steps of:
    transmitting a power adjustment instruction from said first transceiver to said second transceiver; and
    adjusting transmitter power at said second transceiver in response to receiving said power adjustment instruction.

5. A method of specifying a location of a mobile transceiver that communicates with a plurality of fixed transceivers, comprising the step of:
    assessing a distance of said mobile transceiver from each said fixed transceiver in response to transmission of radio signals;
    evaluating an intensity of a received radio signal;
    increasing transmitter power if said intensity is below a first threshold; and
    decreasing said transmitter power if said intensity is above a second threshold, to reduce an introduction of ranging errors due to automatic step changes being made to input amplification;
    selecting each pair combination of assessed distances to identify two candidate positions for each pair selection; and
    identifying a location by calculating an average of said candidate positions.

6. The method of claim 5, further comprising the steps of:
    determining a displacement of each candidate position from said identified location;
    for each of said two candidate positions derived from each pair combination of fixed transceivers, discarding one most distant from said identified location; and
    recalculating a revised location from remaining candidate positions.

7. The method of claim 6, further comprising the steps of:
    analysing an extent to which said remaining candidate positions are displaced from said revised location;
    removing a most displaced candidate position to identify fewer candidate positions; and
    recalculating a further revised location from said fewer candidate positions.

8. The method of claim 5, wherein said assessing step is based on measuring a round trip time of flight between a said fixed transceiver and a said mobile transceiver.

9. A method of transmitting data over a radio network, in which a fixed transceiver transmits distance data to a network data processor and said fixed transceiver is required to wait after a transmission to maintain network compatibility, comprising the steps of:
    collecting bulk distance data for a plurality of mobile transceivers during a ranging time slot;
    transmitting said bulk distance data in a transfer time slot, while maintaining network compatibility;
    evaluating an intensity of a received radio signal;
    increasing transmitter power if said intensity is below a first threshold; and
    decreasing said transmitter power if said intensity is above a second threshold, to reduce an introduction of ranging errors due to automatic step changes being made to input amplification.

10. The method of claim 9, further comprising the steps of:
    establishing a plurality of fixed transceivers; and
    for each said fixed transceiver, assessing distance data for each said mobile transceiver.

11. The method of claim 10, wherein:
    each said fixed transceiver assesses distance data for a selected mobile transceiver, whereafter
    a next mobile transceiver is selected and distance data assessment is repeated until said bulk distance data has been collected at each said fixed transceiver for each said mobile transceiver.

12. The method of claim 10, wherein each said fixed transceiver initiates said transmission of said bulk distance data in a subsequent transfer time slot, after completion of a previous transfer time slot.

13. The method of claim 10, wherein each said fixed transceiver initiates said transmission of said bulk distance data during said transfer time slot.

14. The method of claim 13, wherein said transmission of said bulk distance data from said plurality of fixed transceivers is completed before a window within said transfer time slot provided for allowing data to be received.

15. The method of claim 9, further comprising the steps of:
- selecting pair combinations of distance data for a specific tag to identify a position of two intersections for each said selected pair; and
- processing said identified positions to specify a location of a mobile transceiver.

16. The method of claim 9, wherein:
- said distance data is assessed from ranging data; and
- said ranging data is produced using mutually different transmission characteristics.

17. The method of claim 9, further comprising the step of compensating assessed distances with respect to vertical displacements, such that subsequent data processing is performed with respect to two-dimensional positions.

18. The method of claim 9, further comprising the steps of:
- receiving movement data from a mobile transceiver confirming that movement of a mobile transceiver has not occurred since a previous location specifying iteration; and
- producing a new location output from an average of said previous location and said new location.

* * * * *